(12) United States Patent
Carson et al.

(10) Patent No.: US 9,183,763 B2
(45) Date of Patent: Nov. 10, 2015

(54) CARDIAC SIMULATION DEVICE

(75) Inventors: David Jeffrey Carson, Stuart, FL (US);
Baruch B. Lieber, Aventura, FL (US);
Chandramouli Sadasivan, Wilmington, DE (US); David John Florella, East Setauket, NY (US); Henry Heesang Woo, Setauket, NY (US); Michael Romeo, Port St. Lucie, FL (US)

(73) Assignee: Vascular Simulations, LLC, Wilmington, DE (US)

( * ) Notice: Subject to any disclaimer, the term of this patent is extended or adjusted under 35 U.S.C. 154(b) by 304 days.

(21) Appl. No.: 13/363,251

(22) Filed: Jan. 31, 2012

(65) Prior Publication Data
US 2013/0196301 A1    Aug. 1, 2013

(51) Int. Cl.
G09B 23/30 (2006.01)
G09B 23/28 (2006.01)
G09B 23/32 (2006.01)

(52) U.S. Cl.
CPC ............ *G09B 23/288* (2013.01); *G09B 23/281* (2013.01); *G09B 23/30* (2013.01); *G09B 23/303* (2013.01); *G09B 23/32* (2013.01)

(58) Field of Classification Search
USPC ......................................................... 434/265
See application file for complete search history.

(56) References Cited

U.S. PATENT DOCUMENTS

| | | | | |
|---|---|---|---|---|
| 2,684,684 A | * | 7/1954 | Stevenson | 137/199 |
| 3,376,660 A | * | 4/1968 | McGinnis | 434/268 |
| 3,434,162 A | * | 3/1969 | Wolfe | 623/3.22 |
| 3,541,612 A | * | 11/1970 | Carney | 623/3.21 |
| 3,755,825 A | * | 9/1973 | DeBakey et al. | 128/899 |
| 3,916,449 A | * | 11/1975 | Davis | 623/3.19 |
| 4,687,424 A | * | 8/1987 | Heimes | 417/384 |
| 5,052,934 A | * | 10/1991 | Carey et al. | 434/268 |
| 5,632,623 A | * | 5/1997 | Kolff et al. | 434/272 |

(Continued)

FOREIGN PATENT DOCUMENTS

WO    WO2011094525    8/2011

OTHER PUBLICATIONS

"Endovascular Surgery Training-Evaluation-Simulation EVE Endo Vascular Evaluator", FAIN-Biomedical, accessed at: http://www.fain-biomedical.com/wp-content/themes/fbm_srk/images/eve_fbm_e.pdf (2008).*

(Continued)

*Primary Examiner* — Xuan Thai
*Assistant Examiner* — James Hull
(74) *Attorney, Agent, or Firm* — McHale & Slavin P.A.

(57) ABSTRACT

The present invention describes a device and system for simulating normal and disease state cardiac functioning, including an anatomically accurate left cardiac simulator for training and medical device testing. The system and device uses pneumatically pressurized chambers to generate ventricle and atrium contractions. In conjunction with the interaction of synthetic mitral and aortic valves, the system is designed to generate pumping action that produces accurate volume fractions and pressure gradients of pulsatile flow, duplicating that of a human heart. Through the use of a remote handheld electronic controller and manual adjustments from a main control panel, the air pressure level, fluidic pressure, and heart rate is controlled to induce contractions that simulate a wide variety of heart conditions ranging from normal heart function to severely diseased or injured heart conditions.

25 Claims, 40 Drawing Sheets

(56) References Cited

U.S. PATENT DOCUMENTS

| | | | |
|---|---|---|---|
| 5,634,797 A * | 6/1997 | Montgomery | 434/268 |
| 5,766,207 A * | 6/1998 | Potter et al. | 600/16 |
| 6,062,866 A * | 5/2000 | Prom | 434/268 |
| 6,146,325 A * | 11/2000 | Lewis et al. | 600/16 |
| 6,205,871 B1 * | 3/2001 | Saloner et al. | 73/866.4 |
| 6,234,804 B1 * | 5/2001 | Yong | 434/267 |
| 6,336,812 B1 * | 1/2002 | Cooper et al. | 434/267 |
| 6,461,165 B1 | 10/2002 | Takashina et al. | |
| 6,517,354 B1 * | 2/2003 | Levy | 434/262 |
| 6,685,481 B2 | 2/2004 | Chamberlain | |
| 6,790,043 B2 * | 9/2004 | Aboud | 434/268 |
| 6,843,145 B2 | 1/2005 | Jaszczak et al. | |
| 7,018,327 B1 * | 3/2006 | Conti | 600/16 |
| 7,021,940 B2 * | 4/2006 | Morris et al. | 434/268 |
| 7,063,942 B2 | 6/2006 | Dancu et al. | |
| 7,083,418 B2 * | 8/2006 | Baldauf | 434/272 |
| 7,569,809 B2 | 8/2009 | Vija et al. | |
| 7,798,815 B2 * | 9/2010 | Ramphal et al. | 434/265 |
| 7,866,983 B2 | 1/2011 | Hemphill et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 8,342,852 B2 * | 1/2013 | King | 434/268 |
| 8,608,484 B2 * | 12/2013 | Kalafut et al. | 434/268 |
| 8,632,343 B2 * | 1/2014 | Blackburn | 434/272 |
| 8,636,519 B2 * | 1/2014 | Schwartz et al. | 434/262 |
| 8,678,830 B2 * | 3/2014 | Gurdin et al. | 434/265 |
| 2002/0009386 A1 * | 1/2002 | Lindsay | 422/45 |
| 2003/0088151 A1 * | 5/2003 | Kung et al. | 600/37 |
| 2003/0220718 A1 | 11/2003 | Jaszczak et al. | |
| 2004/0033477 A1 * | 2/2004 | Ramphal et al. | 434/272 |
| 2004/0092789 A1 * | 5/2004 | Tsukahara et al. | 600/16 |
| 2004/0101814 A1 * | 5/2004 | Morris et al. | 434/268 |
| 2005/0100873 A1 * | 5/2005 | Meythaler et al. | 434/267 |
| 2008/0020362 A1 * | 1/2008 | Cotin et al. | 434/267 |
| 2009/0226867 A1 * | 9/2009 | Kalafut et al. | 434/268 |
| 2009/0246747 A1 * | 10/2009 | Buckman, Jr. | 434/272 |
| 2011/0165546 A1 | 7/2011 | May | |
| 2012/0034586 A1 * | 2/2012 | Gomo | 434/265 |
| 2013/0132054 A1 * | 5/2013 | Sharma et al. | 703/9 |

OTHER PUBLICATIONS

JapanProducts, FAIN-Biomedical Inc.—Comprehensive Endovascular Surgery Simulation (http://japan-product.com/ads/fain-biomedical-inc/) with video link (see "Screen Shot" attachment) to YouTube (http://youtu.be/XHTzTk7SD1Y).*

* cited by examiner

SECTION A-A

US 9,183,763 B2

CARDIAC SIMULATION DEVICE

FIELD OF THE INVENTION

This invention relates to a surgical simulation system; and more particularly, to a device and system for simulating normal and disease state cardiac functioning, including an anatomically accurate left cardiac simulator for training and medical device testing.

BACKGROUND OF THE INVENTION

Cardiovascular disease, diseases affecting the heart and the vasculature, and vascular disease, diseases affecting the circulatory system, are prevalent conditions affecting millions of individuals across the globe. While vasculature disease may manifest in the hardening of arterial walls at a specific location, such disease state affects every organ in the human body. Several options exist to alleviate or minimize the risk associated with prolonged vasculature disease states. Depending on the severity, changes in life style, i.e. diet and increased exercise, or the use of drugs may be helpful. In situations where other options will not work or where the disease is severe, surgical intervention remains the primary treatment tool. Traditional surgical procedures have been steadily replaced with more minimally invasive endovascular techniques and such minimally invasive advances in endovascular technology are altering the way surgeons treat vascular diseases.

While vascular surgical procedures are safer than ever, complex vascular surgical procedures can result in collateral damage to the patient. While no surgery is without risk, the level of skill of the surgeon and his/her team, as well as the ability to minimize unforeseen surprises when performing the surgical procedure is paramount to preventing complications and/or death to the patient. Experienced surgeons having performed numerous vascular disease procedures are much more likely to complete such surgical procedures with fewer complications than those surgeons having less experience. While such experience is gained by training and performing numerous procedures, the number of surgical procedures available is a limiting factor. Accordingly, not every surgeon will have the same opportunity to perform the number of surgical procedures needed to obtain a skill level that minimizes the risks of the procedures undertaken. Moreover, as new procedures are developed, senior surgeons may find it difficult to obtain the necessary experience needed.

Training devices for practicing various surgical procedures have been used by surgeons to improve skills and are known in the art. For example, U.S. Pat. Nos. 8,016,598, 7,976,313, and 7,976,312 describe patient simulator systems for teaching patient care. U.S. Pat. No. 7,798,815 discloses an electromechanical pumping system for simulating the beating of a heart in a cardiac surgery training environment. U.S. Pat. No. 7,866,983 discloses a surgical simulator for teaching, practicing, and evaluating surgical techniques. The simulator is described as comprising a cassette of organs, blood vessels, and tissues that may be disposable.

U.S. Pat. No. 7,083,418 discloses a model for teaching or illustrating surgical and/or medical technique. The system is described as having a base component representing tissue or an organ, and several components structured and arranged to be coupleable to and detachable from the base component and/or to each other, to illustrate different positions of the components with respect to one another representing different phases in surgical and/or medical techniques.

U.S. Pat. No. 7,063,942 discloses a system for hemodynamic simulation. The system is described as comprising a vessel having properties of a blood vessel, a reservoir containing a quantity of fluid, tubing connecting the vessel and reservoir, and at least one pump for circulating the fluid within the system.

U.S. Pat. No. 6,843,145 discloses a cardiac phantom for simulating a dynamic cardiac ventricle. The phantom is described as comprising two concentrically-disposed, fluid-tight, flexible membranes defining a closed space between the walls of the membranes.

U.S. Pat. No. 6,685,481 discloses a training device for cardiac surgery and other similar procedures. The device is described as including an organ model such as a cardiac model, an animation network adapted to impart to the model a motion similar to the corresponding natural organ, and a control device used to control the operation of the animation network. The cardiac model is described as being made of two sections, an inner cast simulating the myocardium and an external shell simulating the pericardium.

U.S. Pat. No. 5,052,934 discloses an apparatus to serve as a phantom for evaluation of prosthetic valves and cardiac ultrasound procedures, wherein a controlled pulsatile flow of a blood-mimicking fluid is passed through a multi-chambered region into which are mounted mitral and aortic valves and adjustably positionable ultrasound transducers.

While such training devices are known in the art, the device and system for simulating normal and disease state cardiac functioning in accordance with the present invention provides a training tool that is more anatomically and physiologically correct than such prior art devices, thereby providing a mechanism to reduce collateral damage associated with cardiovasculature or vasculature procedures.

SUMMARY OF THE INVENTION

The present invention describes a device and system for simulating normal and disease state cardiac and vascular functioning, including an anatomically accurate cardiac simulator for training and medical device testing. The system and device uses pneumatically pressurized chambers to generate ventricle and atrium contractions. In conjunction with the interaction of synthetic mitral and aortic valves, the system is designed to generate pumping action that produces accurate volume fractions and pressure gradients of pulsatile flow, duplicating that of a human heart. Through the use of a remote handheld electronic controller and manual adjustments from a main control panel, the air pressure level, fluid pressure, and heart rate is controlled to induce contractions that simulate a wide variety of heart conditions, ranging from normal heart function to severely diseased or injured heart conditions.

The cardiovasculature training and evaluation simulator system and device suitable for training and testing medical devices is adapted to provide an anatomically and physiologically accurate representation of a cardiovasculature system in normal or diseased states. In an illustrative embodiment, the system comprises a support structure, a pneumatically driven cardiac system module for simulating cardiac functioning of a patient, a vasculature system module fluidly connected to the cardiac system module and adapted for simulating the vasculature of a patient, and a control module operatively coupled to the cardiac system module and the vasculature system module. The cardiac module comprises an atrium assembly for simulating an atrium of a heart and a ventricle assembly for simulating a ventricle of a heart. A control module comprises one or more sub-modules for controlling or modifying one or more operational parameters of the system, including heart rate, ejection fraction, systemic vascular resistance and compliance. By modifying the systems parameters, pathological hemodynamic states, including but not limited to sepsis, hyperdynamic therapy with vasopressor agents, or cardiac arrhythmias, such as atrial fibrillation or flutter can be recreated.

The system and devices therefore provide a mechanism that can be used to reduce collateral damage to patients undergoing vascular surgeries resulting from surgeon inexperience or inexperience with complex procedures. By providing a device that replicates the heart and vasculature, the surgeon can perform endovascular procedures prior to having to perform such procedures on the actual patient. Device selection, placement, and optimization can therefore be determined prior to actual surgery, eliminating the risk associated with having to do such tasks during a live procedure.

Accordingly, it is a primary objective of the instant invention to provide a device and system for simulating normal and disease state cardiac functioning.

It is a further objective of the instant invention to provide a device and system for simulating normal and disease state cardiac functioning including an anatomically accurate cardiac simulator for training and medical device testing.

It is yet another objective of the instant invention to provide a device and system for simulating normal and disease state cardiac functioning designed to generate pumping action that produces accurate volume fractions duplicating that of a heart.

It is a further objective of the instant invention to provide a device and system for simulating normal and disease state cardiac functioning designed to provide pressure gradients of pulsatile flow that duplicates a heart.

It is yet another objective of the instant invention to provide a device and system for simulating normal and disease state cardiac function which controls air pressure level, fluid pressure, and heart rate, thereby inducing contractions that simulate a wide variety of heart conditions.

It is a still further objective of the invention to provide a device and system for simulating normal cardiac functioning which controls air pressure level, fluid pressure, and heart rate to induce contractions that simulate a wide variety of heart conditions having normal heart functions.

It is a further objective of the instant invention to a provide a device and system for simulating disease state cardiac functioning which controls air pressure level, fluid pressure, and heart rate to induce contractions that simulate a wide variety of heart conditions having diseased or injured heart conditions.

It is a further objective of the instant invention to provide a training and evaluation simulator system and device suitable for training and testing medical devices which is adapted to provide an anatomically and physiologically accurate representation of a cardiovasculature system in normal or diseased states.

It is yet another objective of the instant invention to provide a training and evaluation simulator system and device having a control module adapted for controlling or modifying one or more operational parameters of the system, including heart rate, ejection fraction, systemic vascular resistance and compliance.

It is a still further objective of the invention to provide a training and evaluation simulator system and device in which pathological hemodynamic states, including but not limited to sepsis, hyperdynamic therapy with vasopressor agents, or cardiac arrhythmias, such as atrial fibrillation or flutter can be recreated.

It is a further objective of the instant invention to provide a training and evaluation simulator system and device which allows a surgeon to perform endovascular procedures prior to having to perform such procedures on the actual patient.

It is yet another objective of the instant invention to provide a training and evaluation simulator system and device which allows a surgeon to determine device selection, placement, and optimization prior to actual surgery, eliminating the risk associated with having to do so during a live procedure.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
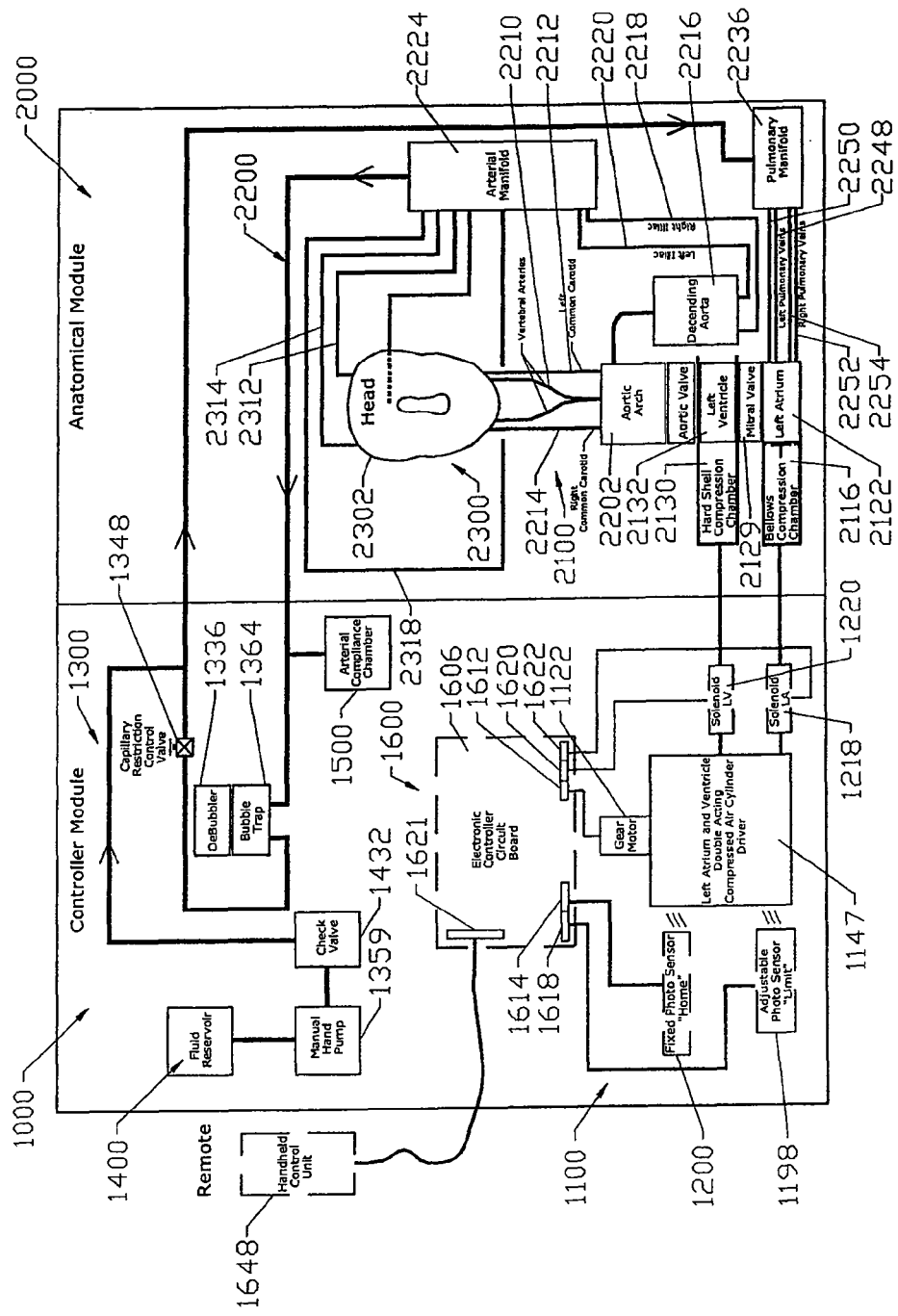
FIG. 1 is a block diagram of the simulator system in accordance with an illustrative example of the present invention.

Referring to FIG. 1, a schematic block diagram of the simulator system generally referred to as the cardiovascular simulator system 10 is illustrated. The simulator system 10 is illustrated and described as a cardiovascular system. However, the simulator system is not limited to the cardiovascular system and can be adapted to replicate other systems. The cardiovascular simulator system 10 comprises of one or more modules including a control module 1000 and an anatomical module 2000. The control module 1000 and the anatomical module 2000 interact in a manner to provide a system which is an anatomically and functionally accurate replication of a body system, i.e. a cardiac and/or vasculature system. Providing such an anatomically correct system provides the user a unique tool to practice and train for various surgical procedures and/or techniques prior to having to perform such actions on a living system. While such system will be described using human anatomy and systems, the vascular simulator system in accordance with the instant invention can be adapted to replicate or model other organism systems, such as but not limited to domesticated animals such as dogs and cats, rodents such as mice and rats, livestock such as cattle, horses, sheep, swine/porcine, or wild animals such as lions or tigers.

Each of the control module 1000 and the anatomical module 2000 further contains sub-modules. The sub-modules comprise individual components that drive the system and/or provide accurate structural and functional replication of a living system. As will be described in greater detail, the control module 1000 contains one or more sub-modules including a pneumatics module 1100, a hydraulics module 1300, a fluid storage module 1400, a compliance module 1500, and an electronics module 1600. The anatomical module 2000, illustrated herein as a cardiovasculature system, is primarily made up of three sub-modules, including a cardiac simulator module 2100, a vasculature simulator module 2200, and one or more peripheral organ/systems simulator module 2300.

Referring to FIGS. 2-5, an illustrated example of the control module 1000 is shown. As shown in the figures, each of the sub-modules, including the pneumatics module 1100, the hydraulics module 1300, the fluid reservoir module 1400, the compliance module 1500, and the electronics module 1600, are stored within a control module chamber chassis 1002. The control module chamber chassis 1002 contains a plurality of walls 1004, 1006, 1008, 1010 and a bottom wall 1012 to form an interior 1014 portion, see FIG. 5. The interior portion 1014 is sized and shaped to accommodate each of the plurality of sub-modules enclosed within. A top portion, illustrated herein as a cover 1016, is sized and shaped to engage the lower portion 1012. In a preferred embodiment although non-limiting embodiment, the control module chamber chassis cover 1016 is hingedly connected to the bottom portion 1012 through one or more hinges, not illustrated. Accordingly, alternative means of connection as known to one of skill in the art can be used.

Enclosing the sub-modules in a removable case allows the user the ability to move the control module 1000 and its components easily. Alternatively, each of the sub-modules may be stored individually on a support structure, such as a board. Secured to the inner surface 1018 of the cover 1016 through fastening members, such as but not limited to screws 1020 and pins 1022, is the electronics module 1500. The cover 1016 may contain at least one opening 1023 adapted to fit a connecting device for connecting an external device to the electronics module 1600. Although not illustrated, the cover 1016 and one or all of the walls may contain a locking mechanism for securable engagement.

The interior portion 1014 preferably contains one or more horizontal fastening beams arranged along the interior surface of the side walls, such as a first fastening beam 1024 secured to the interior surface 1026 of the side wall 1010. A second fastening beam 1028 is positioned between two side walls and secures to the interior surface 1030 (not shown) of side wall 1004 and the interior surface 1032 of side wall 1008. The fastening beams 1024 and 1028 may contain notches 1030 and/or apertures 1032 adapted to receive fastening members, such as screws or tightening pins to allow each of the sub-modules to be securely placed within. At the top surface 1034 of the bottom wall 1012 is a bumper 1036. The side walls 1004, 1006, 1008, or 1010 may also contain vertically aligned beams 1038 and 1040 for added support or securing the modules within. Additionally, side wall 1008 may contain a recessed portion 1042 containing inlet/outlet conduits 1044 (fluid out to the anatomical module, representing venous input) and 1046 (fluid into the control module, representing the arterial output). Additional recessed portions 1048 and 1050 contain additional external pneumatic connectors 1052 (arterial pneumatics out), 1054 (ventricle pneumatics out), and 1056 and allow for air to travel to the anatomical module 2000.

Referring to FIGS. 6-16, an illustrative example of a pneumatics module 1100 is illustrated. The pneumatics module 1100 contains the necessary components to provide one or more modules of the cardiovascular simulator system 10 with compressed air. The compressed air generated allows one or more of the components of the cardiac simulator module 2100, which is pneumatically connected to the pneumatics module 1100, to compress and forcibly expel any substance, such as liquid contained therein, out, as will be described later. Accordingly, the pneumatics module 1100 acts to provide the cardiac simulator module 2100 with accurate simulation of cardio dynamic functions.

Figure 6:
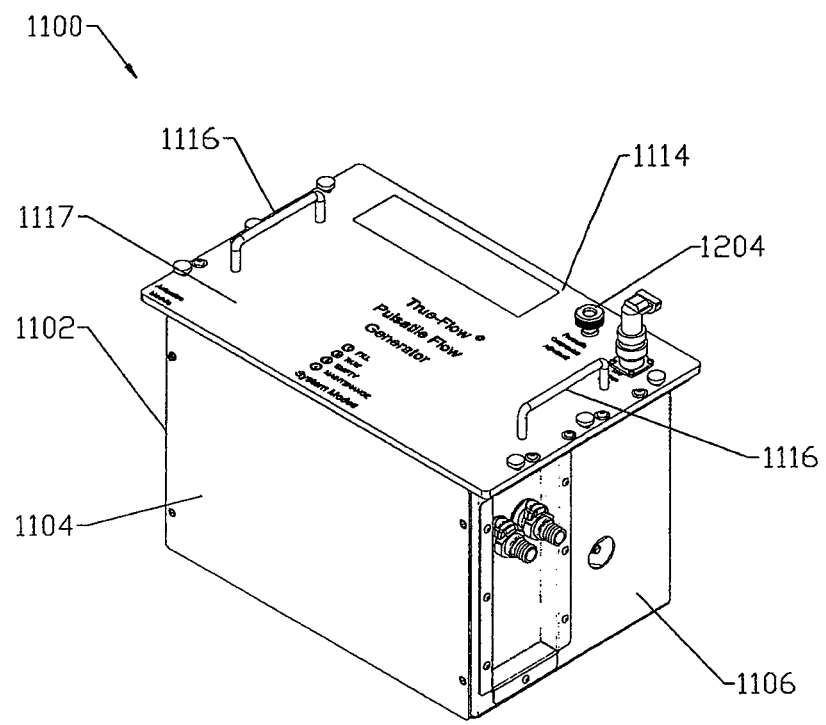
FIG. 6 is a perspective view of the pneumatic modular chassis of the present invention.
Figure 7:
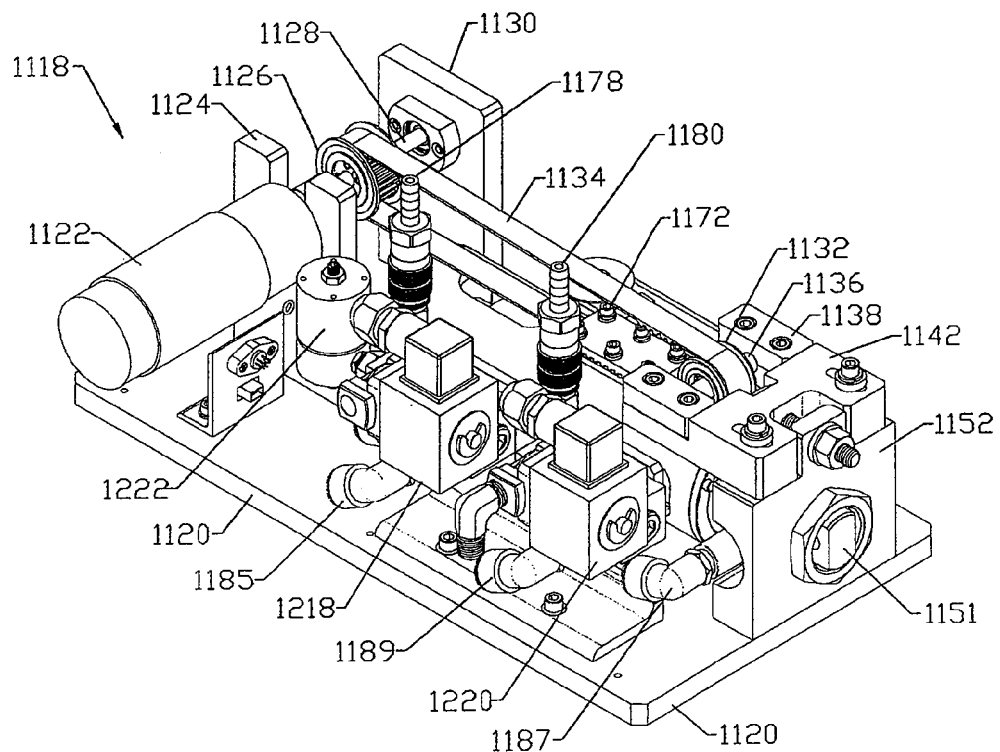
FIG. 7 is a perspective view of an illustrative example of a pneumatic actuator assembly.

Most of the components of the pneumatics module 1100 are enclosed within a pneumatic module chassis 1102. Referring to FIG. 6, the pneumatic module chassis 1102 contains a plurality of side walls 1104, 1106, 1108 (not illustrated), and 1110 (not illustrated) and a bottom wall 1112 (not illustrated). Each of the walls are arranged to create an internal compartment which stores the working components of the pneumatics module 1100 within. A pneumatic module chassis cover 1114 encloses the internal compartment. A pair of handles 1116 is attached to the outer surface 1117 of the pneumatic module chassis cover 1114 to allow the user to easily and quickly remove the pneumatic module chassis 1102 from the control module chamber chassis 1002.

Referring to FIGS. 7-16, a pneumatic actuator assembly, referred to generally as 1118, housed within the pneumatic module chassis 1102 is illustrated. The pneumatic actuator assembly 1118 provides the necessary pressurized pneumatic fluid flow (i.e. air or other gases) needed to drive other parts of the cardiovasculature simulator system 10, particularly the cardiac simulator module 2100. The components of the pneumatic actuator assembly 1118 are directly or indirectly coupled to a pneumatic actuator assembly support structure 1120. The pneumatic actuator assembly 1118 is designed to drive air into a plurality of locations within the cardiac simulator module. To achieve such functionality, a motor 1122, such as a standard DC motor is used to drive a first pulley assembly 1123. While a standard DC motor is illustrated, other motors such as a stepper motor can be used as well.

The motor 1122, which is supported by a first support structure 1124, rotates a first drive pulley 1126 through rotation of a first pulley shaft 1128. The first pulley shaft 1128 is secured to a second support structure 1130. Rotation of the first drive pulley 1126 causes rotation of a driven pulley 1132 through movement of a first belt 1134. The belt may be, for example, a standard synchronous belt with teeth 1135 (see FIG. 13), such as but not limited to trapezoidal teeth or curvilinear teeth. The driven pulley 1132 is supported by a second pulley shaft 1136 which is coupled to parallel arms 1138 and 1140 of a third support structure 1142. Belt aligning members 1144 and 1146 are used to align or adjust the tension of the belt 1134.

Figure 8:
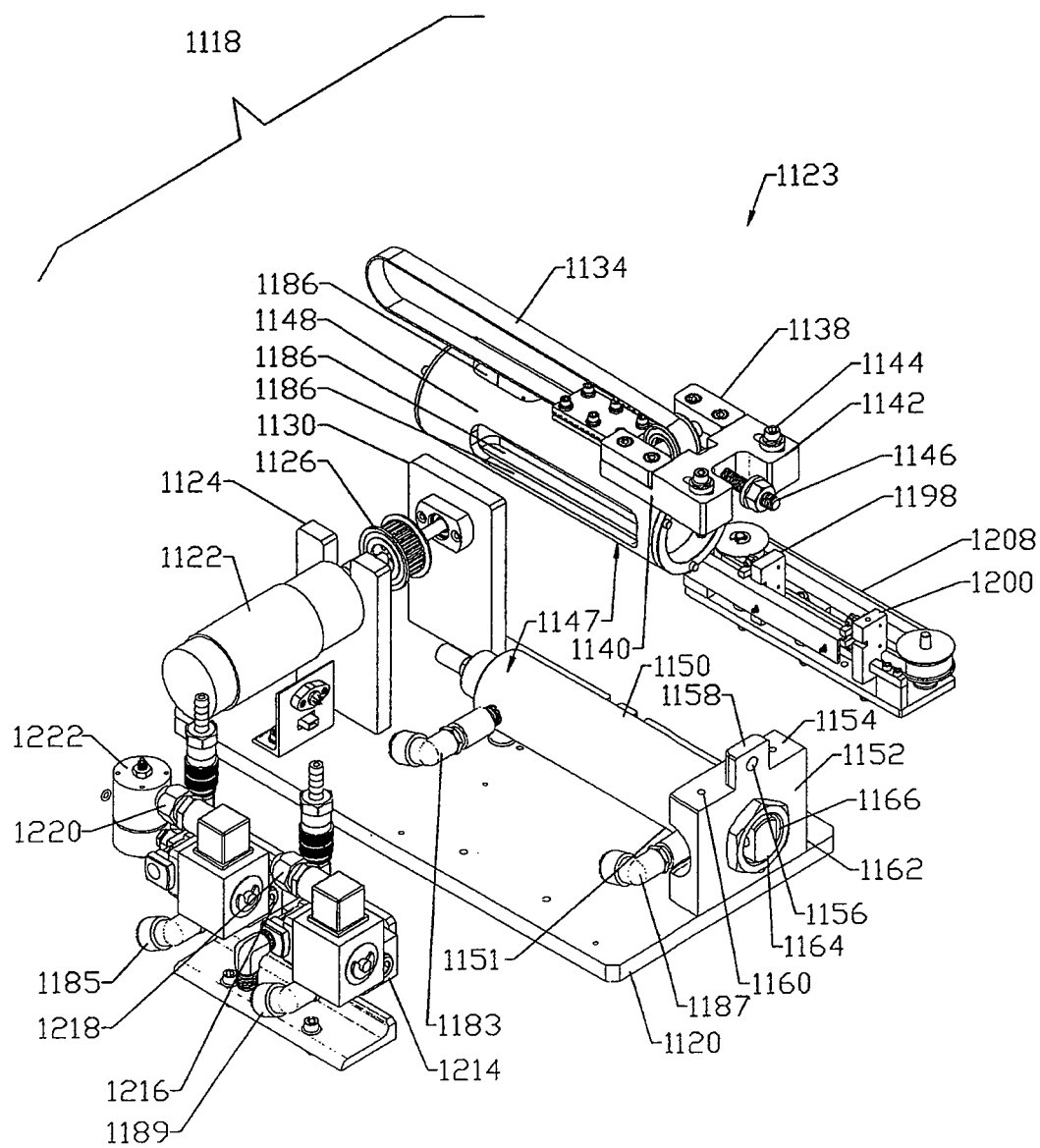
FIG. 8 is an exploded perspective view of the pneumatic actuator assembly.
Figure 9:
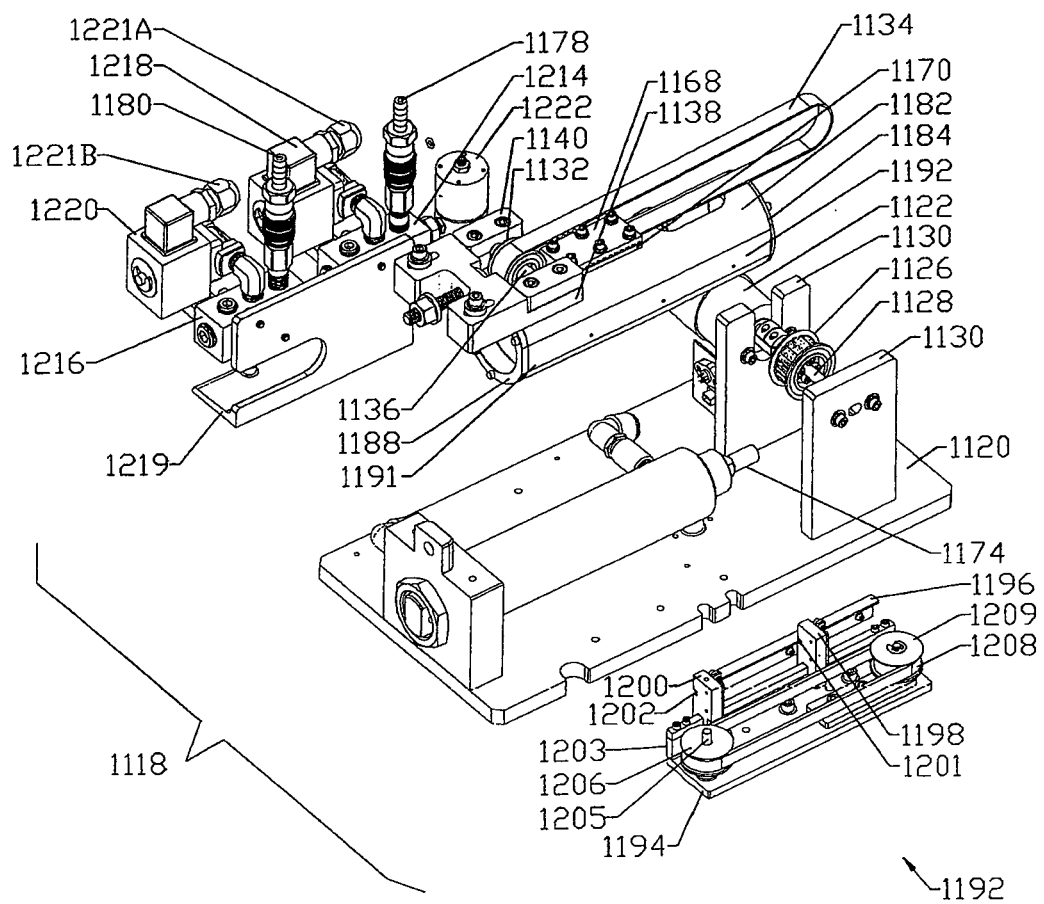
FIG. 9 is an exploded perspective view of the pneumatic actuator assembly.
Figure 10:
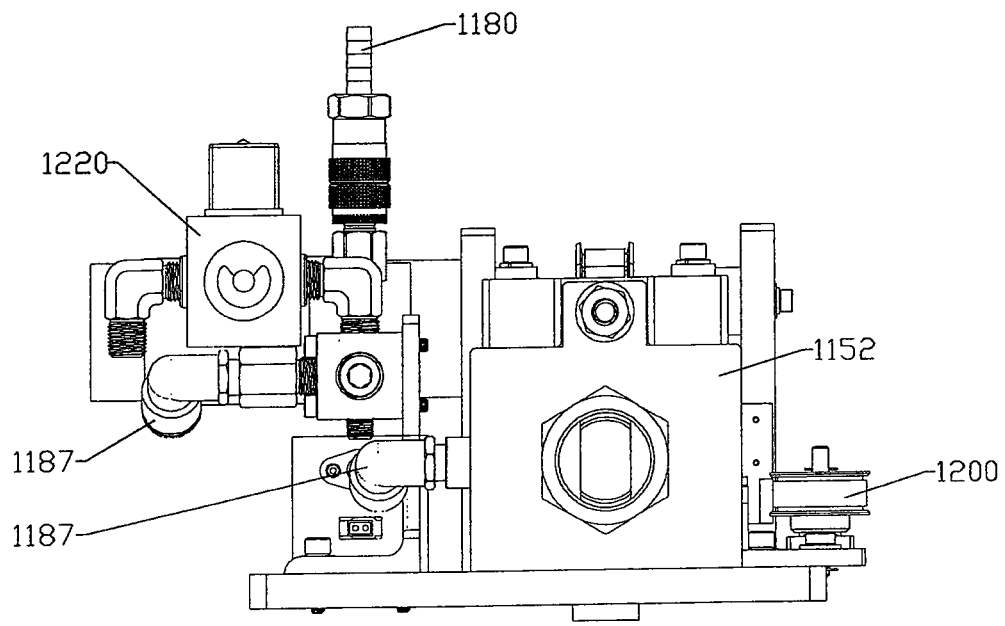
FIG. 10 is a right side view of the pneumatic actuator assembly.
Figure 11:
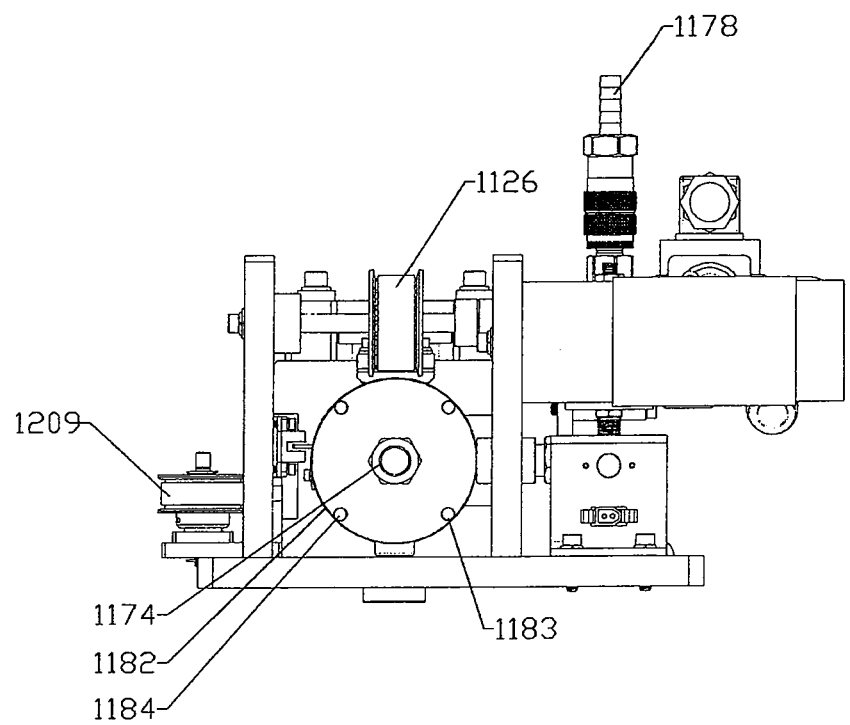
FIG. 11 is a left side view of the pneumatic actuator assembly.
Figure 12:
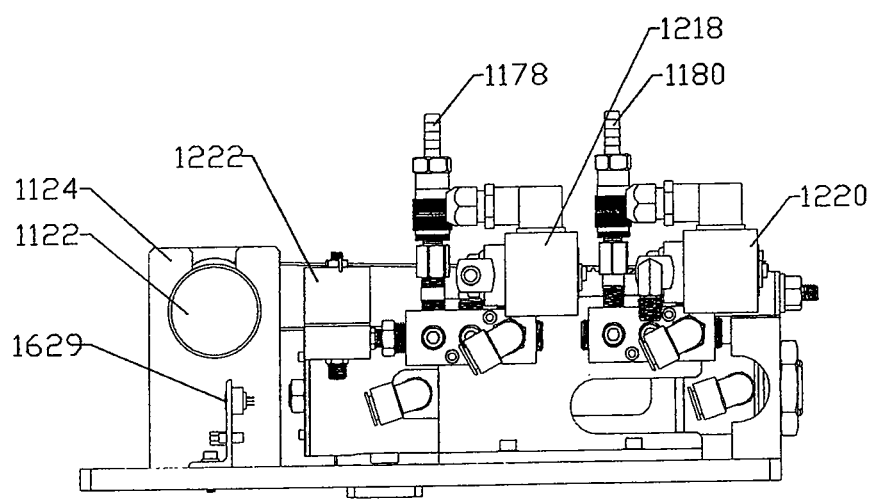
FIG. 12 is a front view of the pneumatic actuator assembly.
Figure 13:
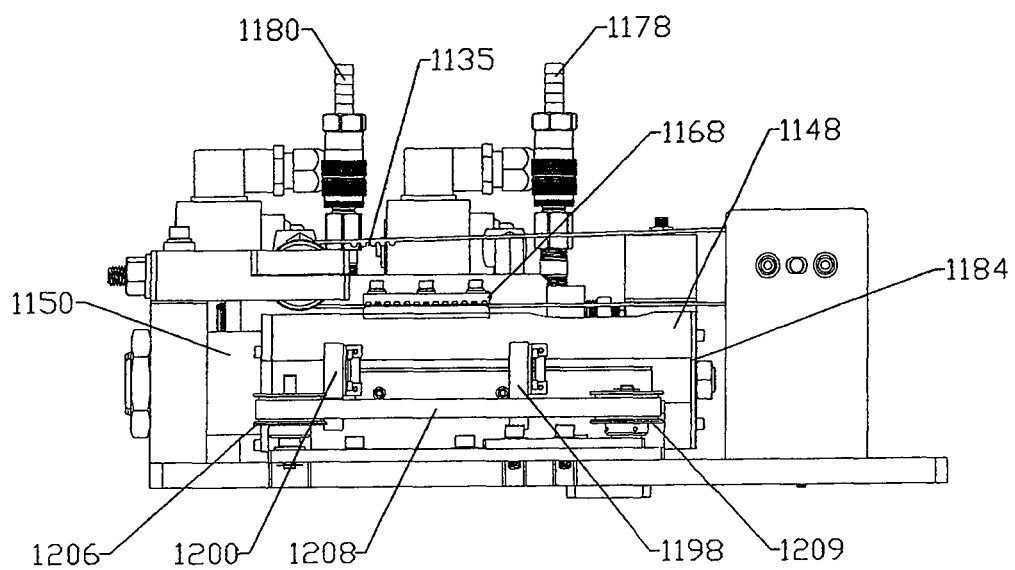
FIG. 13 is a rear view of the pneumatic actuator assembly.
Figure 14:
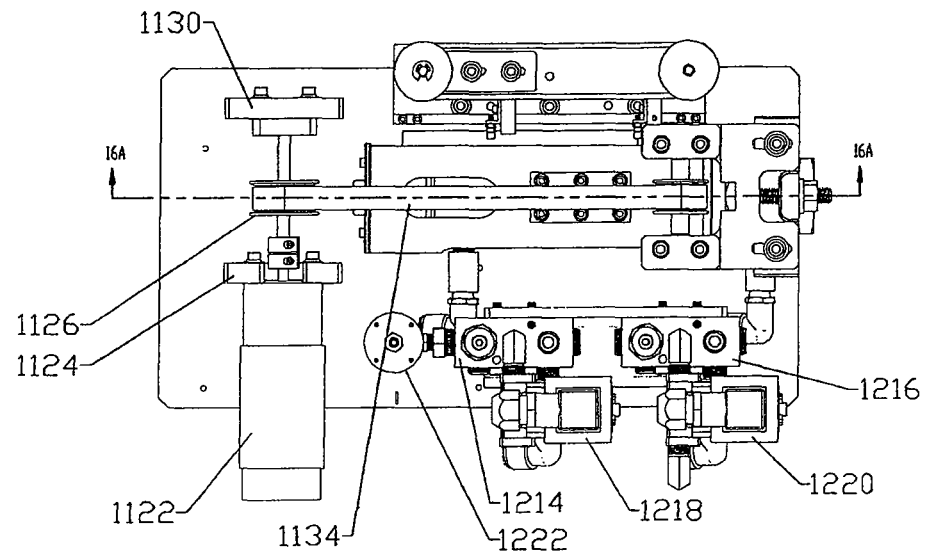
FIG. 14 is a top view of the pneumatic actuator assembly.
Figure 15:
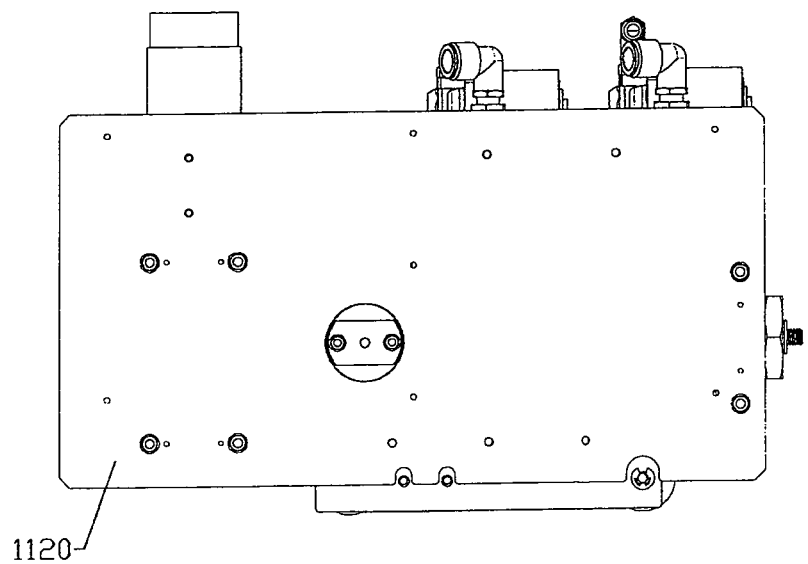
FIG. 15 is a bottom view of the pneumatic actuator assembly.

The pneumatic actuator assembly 1118 includes a pneumatic compliance adjustment component which functions as a compressed air cylinder driver, illustrated herein as a cylinder tube assembly, referred to generally as 1147 on FIG. 8. The cylinder tube assembly 1147 is configured to provide pressurized air which is directed to the cardiac simulator module 2100 and functions to provide contraction of the cardiac components. The cylinder tube assembly 1147 contains a cylinder sleeve 1148 coaxially aligned with a cylinder 1150. The back end 1151 of the cylinder 1150 is secured to a cylinder support structure 1152. The cylinder support structure 1152 is secured to the third support structure 1142 at the top end 1154 through insertion into the opening 1156 within the protrusion member 1158. The cylinder support structure 1152 is further secured to the third support structure 1142 through insertion of aligning member 1144 through the opening 1160. The cylinder support structure 1152 secures to the pneumatic actuator assembly support structure 1120 at the bottom end 1162. The base end 1164 of the cylinder 1150 is preferably secured within the opening 1166 of the cylinder support structure 1152. A belt clamp 1168 couples the belt 1134 to the cylinder sleeve 1148 such that as the belt 1134 moves, the cylinder sleeve 1148 moves along the cylinder 1150 as well. The belt clamp 1168 contains two plates 1170, see FIG. 9, secured together through securing members 1172, such as screws or nuts, to allow for passage of the belt 1134 there through.

Figure 16:
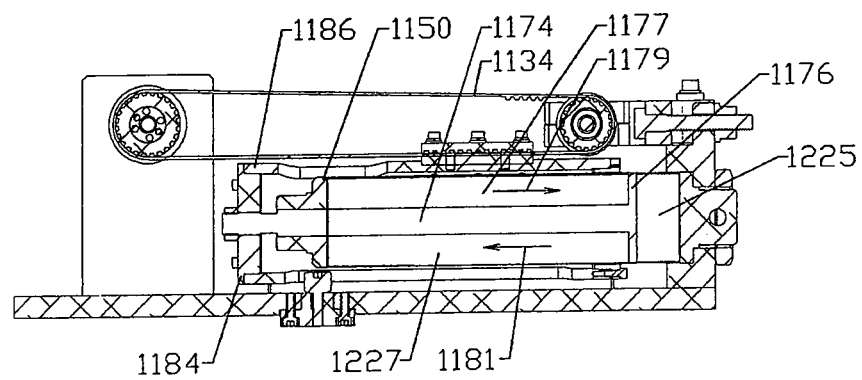
FIG. 16 is a cross-sectional view of the cylinder tube assembly taken along lines 16A-16A of FIG. 14.

Inside the cylinder 1150 is a rod 1174 with a piston 1176 attached, see FIG. 16. The rod is coupled to the cylinder sleeve 1148 so that, as the cylinder sleeve 1148 moves along the fixed cylinder 1150, the piston 1176 moves bi-directionally through space 1177 to generate air flow in the form of pressurized air in both directions. For example, as the piston 1176 moves to the right, see arrow 1179, pressurized fluid in the form of compressed air is generated and expelled out of the cylinder 1150 through fluid conduit 1178 (see FIG. 9). The pressurized air is directed to the atrium side (to be described later) of the cardiac chamber 2100 through tubing (not illustrated). As the piston 1176 moves in the opposite direction, see arrow 1181, a second pressurized air is generated and can be expelled out through a different air conduit 1180 (see FIG. 9). The pressurized air through fluid conduit 1180 is directed to the ventricle side (to be described later) of the cardiac chamber 2100 through tubing (not illustrated). Prior to exiting to the cardiac chamber 2100 through the fluid conduit 1178, pressurized air exits out the cylinder though tubing connector 1183 to a connector 1185. Prior to exiting to the cardiac chamber 2100 through connectors 1180, pressurized air exits out the cylinder though tubing connector 1187 to a connector 1389. Bi-directional movement, therefore, allows the generation of pressurized air which can be directed to various parts of the cardiac simulator module 2100, thereby simulating atrial and ventricular "beating" through the contraction of corresponding cardiac simulator module portions, thereby simulating the systolic compression of the cardiac chambers.

The cylinder sleeve 1148 is coupled to the rod 1174 at one end 1182 through a plate 1184. The plate 1184 is secured to the cylinder sleeve 1148 through fastening members 1183, see FIG. 11. At the opposite end 1191 of the cylinder sleeve 1148 is a bushing 1188. The co-axial alignment allows the cylinder sleeve 1148 to move along the cylinder in a bi-directional, i.e. forward/reverse linear manner. The cylinder sleeve 1148 may contain one or more slots 1186 to allow for movement without contacting other components, such as the pulley 1126 or fluid connector devices, such as elbow connectors and/or tube barbs that are used to fluidly connect the cylinder assembly to other components of the system.

The cylinder tube assembly 1147 further contains a second pulley system, refereed to generally as 1192, coupleable to the cylinder sleeve 1148. The second pulley system 1192 provides for control and manipulation of the pneumatic actuator assembly 1123 stroke adjustment. This system controls the air volume, increasing or decreasing the heart chamber compression and thus the cardiac output, i.e. the amount of fluid expelled from the cardiac simulator module and the force of expelling the fluid into the cardiac simulation module 2100. The second pulley system 1192 is supported by a second pulley support structure 1194. An interposer bracket 1196 is used to provide a mechanism to trigger changes in the stroke of the pneumatic actuator assembly 1123 through the use of a first sensing plate (limit set point) 1198 and a second home sensing plate 1200. Both the first sensing plates (limit set point) 1198 and the second home sensing plate 1200 are adapted so that interposer bracket 1196 can move through a portion there through. Each of the sensing plates 1198 and 1200 may contain a cut out portion 1201 and 1202 in which the interposer bracket 1196 moves through as the cylinder sleeve 1150 moves bi-directionally. Both sensing plates 1198 and 1200 each contain a sensor (not illustrated), such as a laser, configured to detect directional movement of the interposer bracket 1196.

As the cylinder sleeve 1148 moves, the attachment interposer bracket 1196 moves through a portion of the first sensing plate (limit set point) 1198 triggering the sensor. The first sensing plate sensor is electronically coupled to the electronic control module 1600. The triggering event, the sensing of the interposer bracket 1196, electrically communicates with the motor 1122 to reverse the polarity and drive the motor in the opposite direction. Such action results in the belt 1134 reversing direction, causing the cylindrical sleeve 1150 to reverse directions as well. The interposer bracket 1196 moves in the opposite direction towards second home sensing plate 1200, triggering its sensor upon reaching its destination. Once the interposer bracket 1196 triggers the second sensor, which is electronically coupled to the electronic control module 1600 the motor 1122 reverses direction, causing the cylinder sleeve 1148 and the interposer bracket 1196 to move in the opposite direction, or back to the original direction of movement. As the cylinder sleeve 1148 is moving bi-directionally, the attached rod moves the piston 1176 as well, causing air to move out of the cylinder 1150 and into fluid outlets 1178 or 1180 depending on the movement of the piston 1176.

In this manner, the interposer bracket 1196 oscillates in a back and forth motion triggering changes in pneumatic events, i.e. expelling air into the atrium module or ventricle module, and vice versa on the movement in the opposite direction. The distance between the first sensing plate (limit set point) 1198 and the second home sensing plate 1200 is adjustable, thereby changing the rate at which the cylinder moves in each direction. Preferably, first sensing plate 1198 is adjustable with the second home sensing plate 1200 as it is fixed to the rail 1203. A pneumatic compression adjustment knob 1204, see FIG. 6, adjusts the positioning of the first sensing plate 1198 relative second sensing plate 1200. Moving the sensors provides a mechanism to increase/decrease contractions of the atrium and ventricle. Engaging the pneumatic compression adjustment knob 1204 causes the shaft 1205 to rotate the drive pulley 1206 of the second pulley assembly 1192, moving the second pulley assembly belt 1208 and the driven pulley 1209. The first sensing plate 1198 is secured to the second pulley assembly belt 1208 thereby moving the first sensing plate 1198 directionally along the rail 1203. Alternative mechanisms for controlling the bi-directional movement of the cylinder sleeve, including devices using feedback mechanisms such as servomechanism, can be used.

Pneumatically coupled to the cylinder tube assembly 1147 are manifolds 1214 and 1216 and 24V solenoid valves 1218 and 1220. The manifolds 1214 and 1216 and 24V solenoid valves 1218 and 1220 are supported by support structure 1219 which is securable to the pneumatic actuator assembly support structure 1120. The solenoid valves 1218 and 1220 are configured to controllably open and close to provide a mechanism to allow air to enter into the cylinder 1150 through solenoid air-in connectors 1221A and 1221B. As the piston 1176 is moving in the direction of arrow 1179 in FIG. 16, one of the solenoids, for example 1218, is open to allow air into the space 1225 within cylinder 1150. The other solenoid, 1220, is in the closed position so that air cannot be directed into the second space 1227. The air within the second space 1227 gets compressed as the piston 1176 moves in the opposite direction, see arrow 1181. During this movement, the solenoid 1218 opens to allow air into space 1225 and the solenoid 1220 is closed. A pressure regulator 1222, fluidly connected to the manifold 1214, prevents over pressure of the atrial actuation system.

FIGS. 17-22 show an illustrative example of the hydraulic module 1300. The hydraulic module 1300 is adapted to: 1) provide a mechanism for removal of air bubbles trapped within the fluid moving through the system, 2) provide fluid pressure (simulating blood pressure) control by controlling resistance to fluid flow that circulates into (simulating the arterial circuit) and out of the hydraulic module 1300, and enters back into (simulating the pulmonary circuit of) the anatomical module 2000 and 3) provide a mechanism to initiate fluid flow through the system. Adjustment of the fluid pressure control is accomplished through adjusting capillary resistance, to be described later, and through vascular tonometry through the use of a compliance chamber module 1500, as described later.

Figure 17:
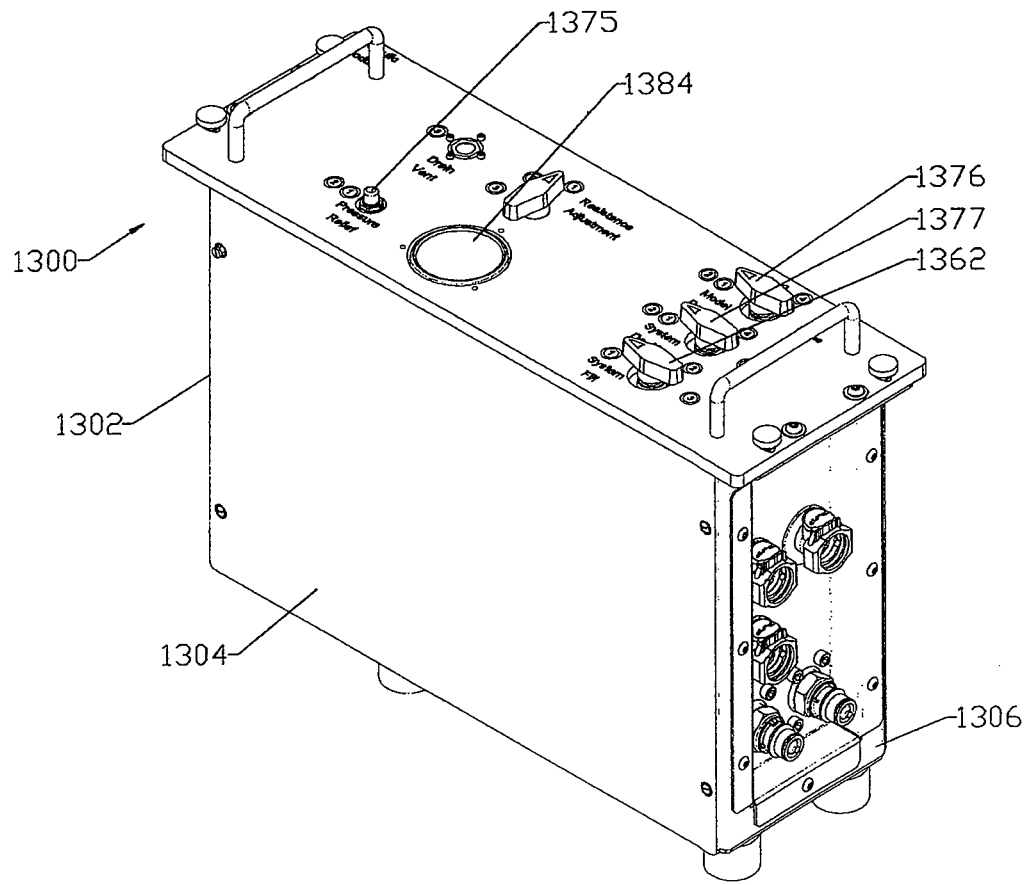
FIG. 17 is a perspective view of an illustrative example of a hydraulics module of the present invention.
Figure 18:
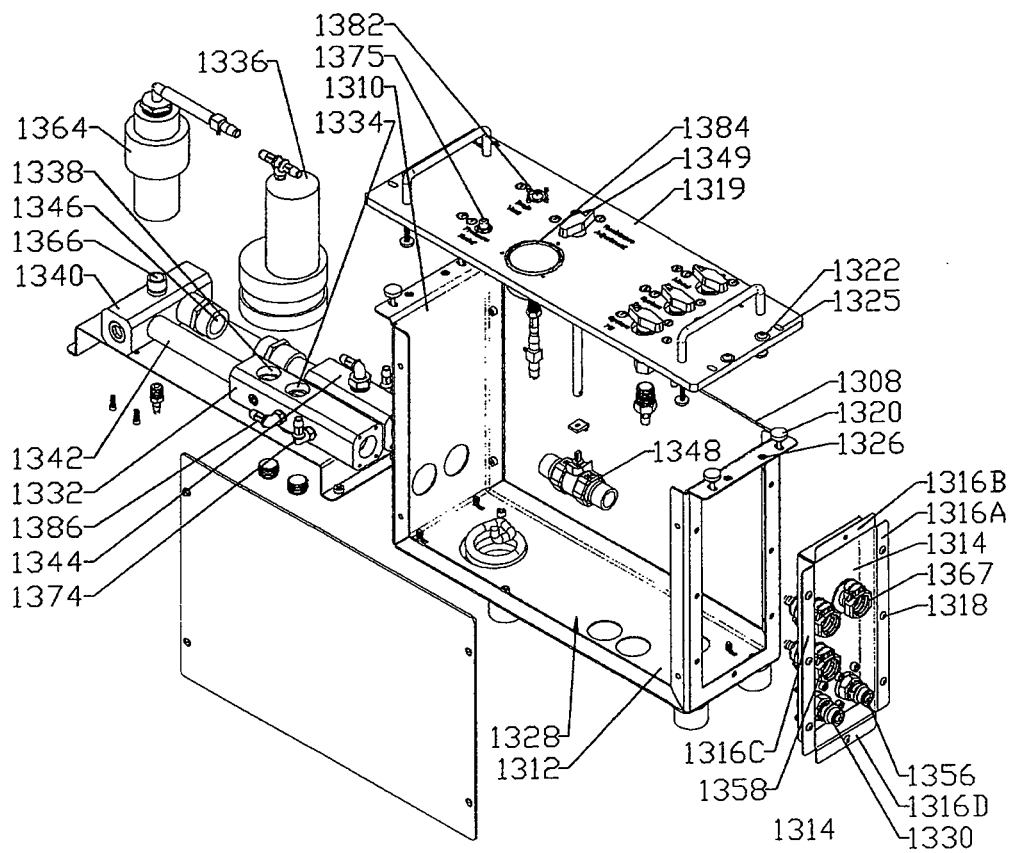
FIG. 18 is an exploded perspective view of the hydraulics module.
Figure 19:
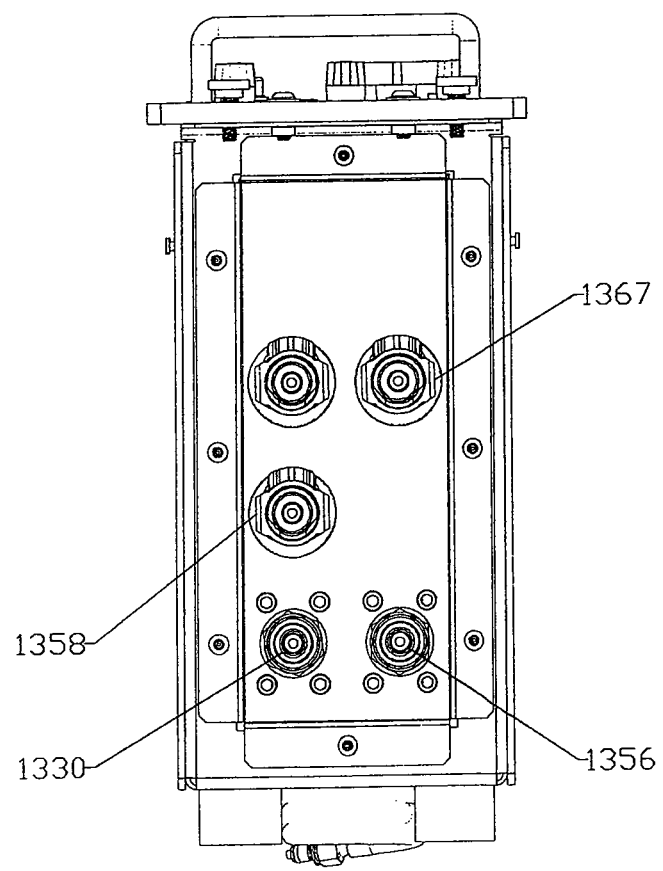
FIG. 19 is a right side view of the hydraulics module.
Figure 20:
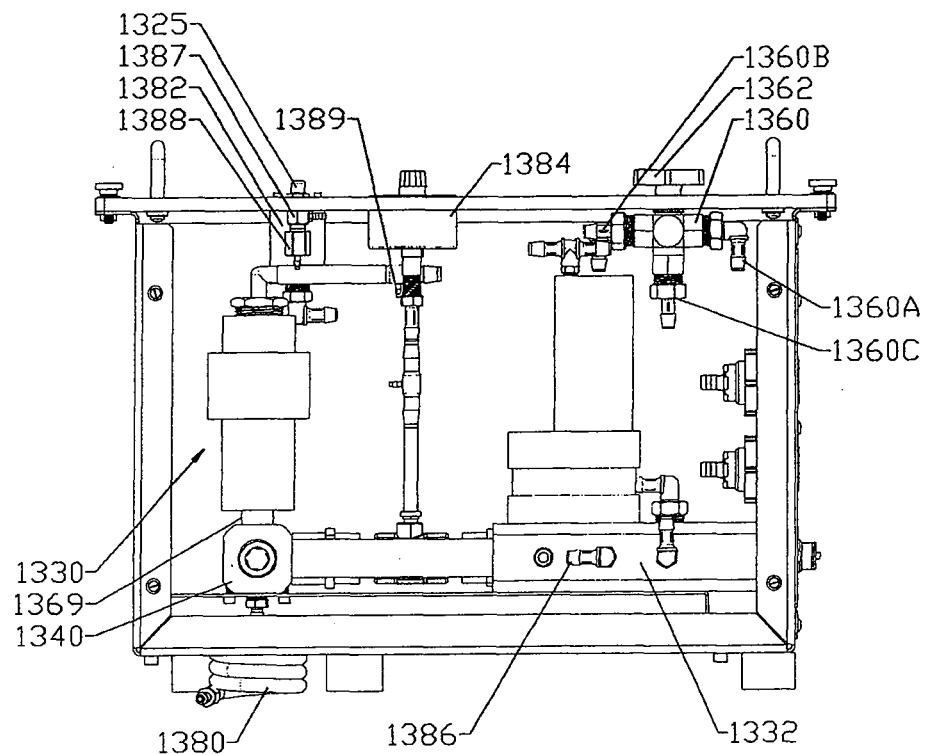
FIG. 20 is a front view of the hydraulics module chassis with the front side wall removed.
Figure 21:
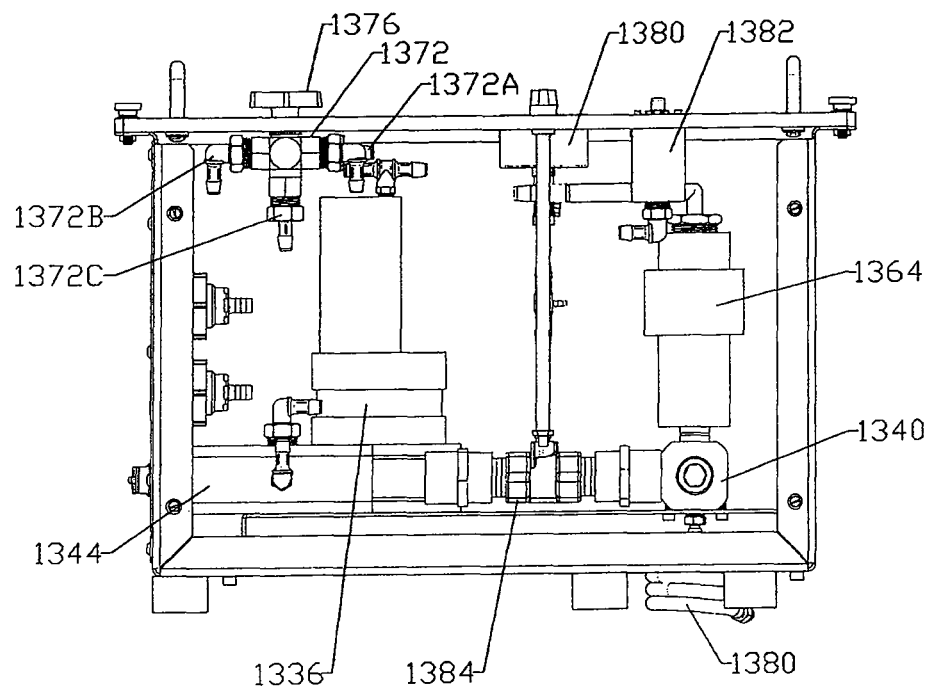
FIG. 21 is a back view of the hydraulics module chassis with the back side wall removed.
Figure 22:
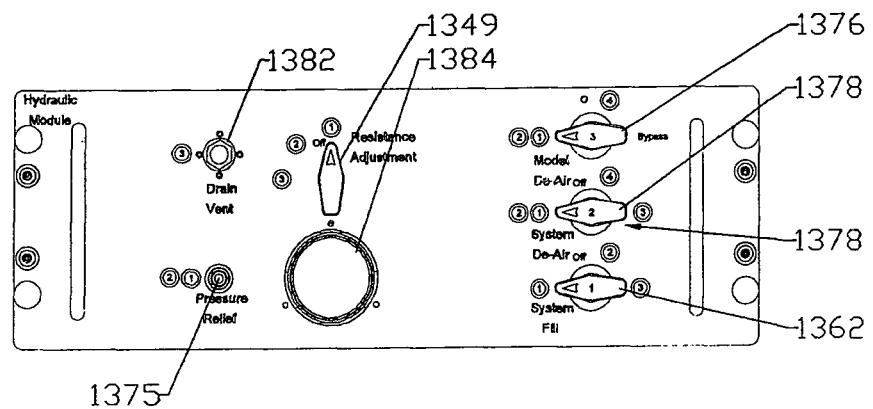
FIG. 22 is a view of the top panel of the hydraulics module chassis.

Similar to the other modules, most of the components of the hydraulics module 1300 are enclosed within a hydraulic module chassis 1302. Referring to FIGS. 17 and 18, the hydraulic module chassis 1302 contains a plurality of side walls 1304, 1306, 1308, 1310 and a bottom wall 1312. The side wall 1306 contains a recessed portion 1314 having one or more fluid conduits or connectors attached thereto for connecting to external devices, such as tubes or other fluid connectors. The recessed portion 1314 contains flanged portions 1316A, 1316B, 1316C, and 1316D which secure to a portion of the side wall 1306 through fastening members such as screws 1318 or pins 1320. As illustrated, one or more of the side walls may be removeably attached to one or more of the other side walls. A top panel 1319 is secured to the side walls 1304, 1306, 1308 and 1310 through insertion of the pin 1320, screws 1322 and washers 1324 into openings 1325, 1326 respectively, thereby forming an interior portion 1328.

Figure 3:
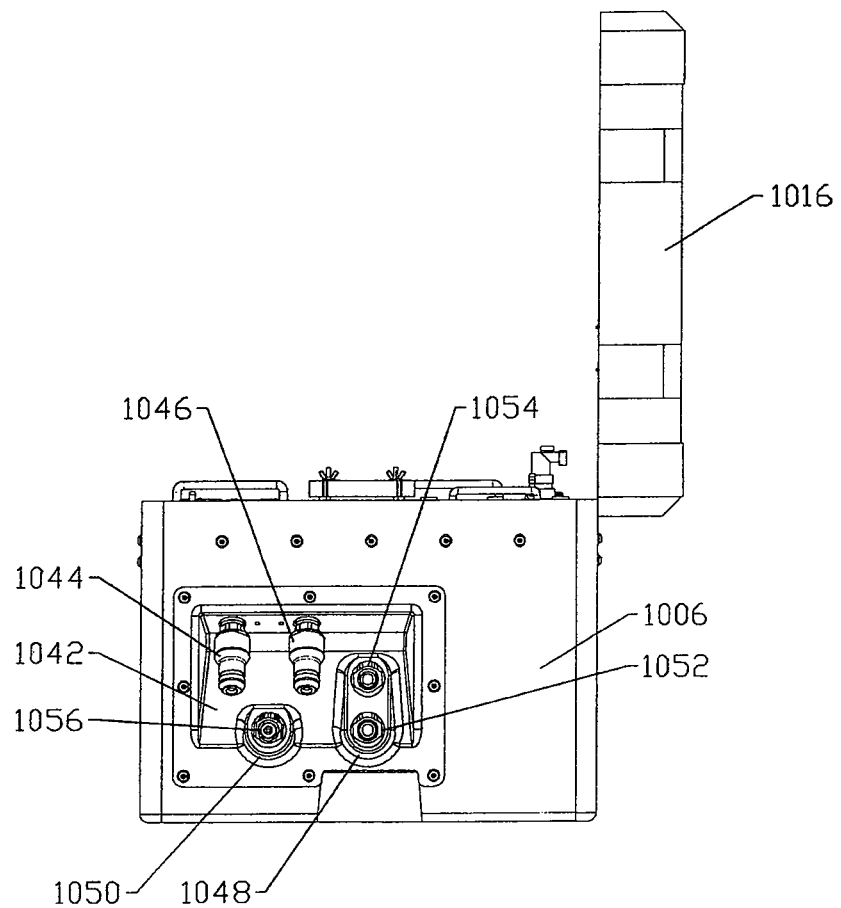
FIG. 3 is a side view of the controller module.
Figure 31:
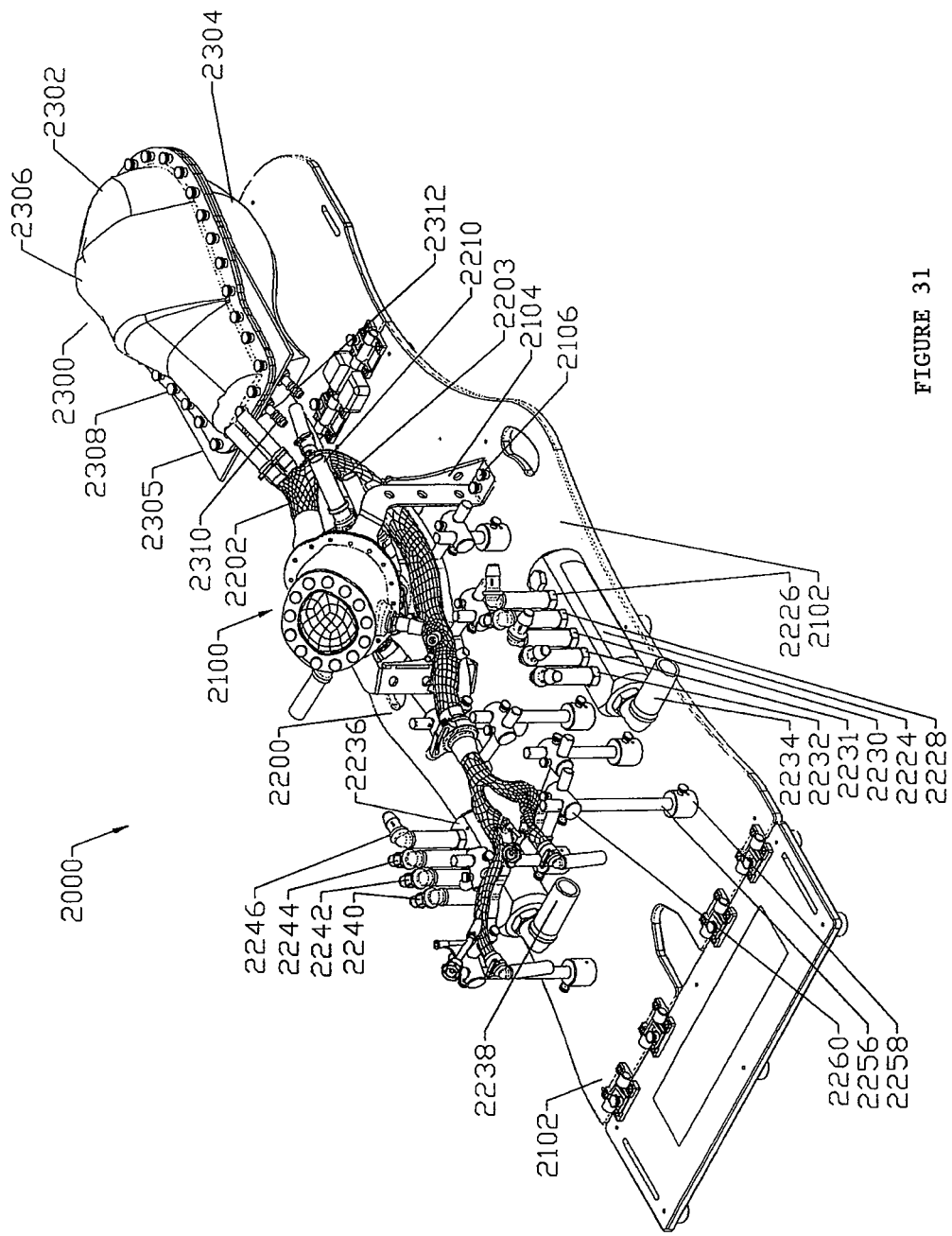
FIG. 31 is a perspective view of an illustrative embodiment of the anatomical module.
Figure 32:
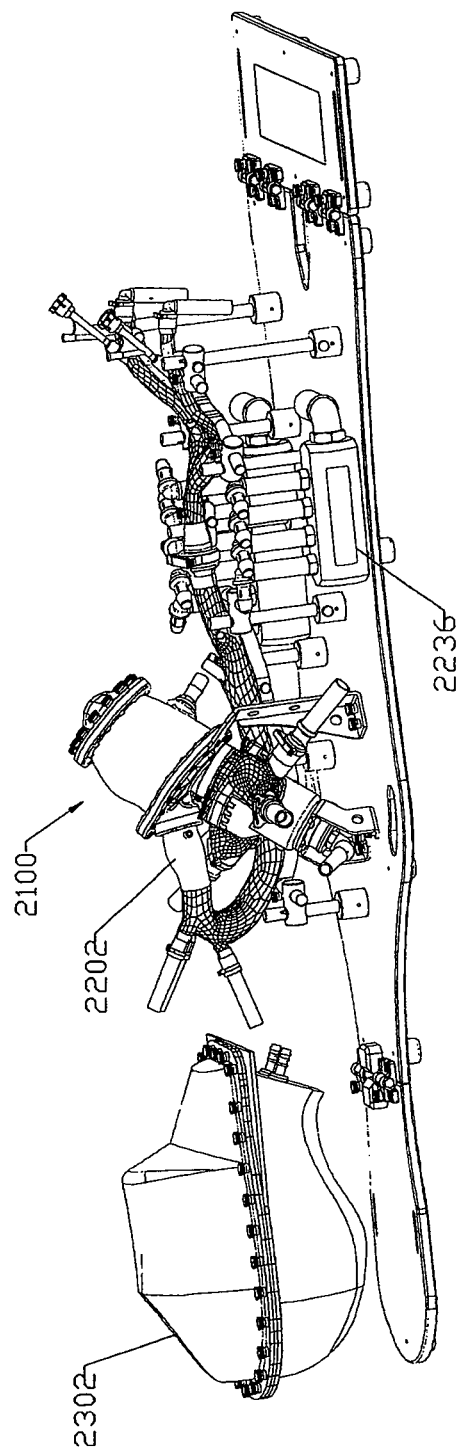
FIG. 32 is a front side view of the anatomical module.
Figure 33:
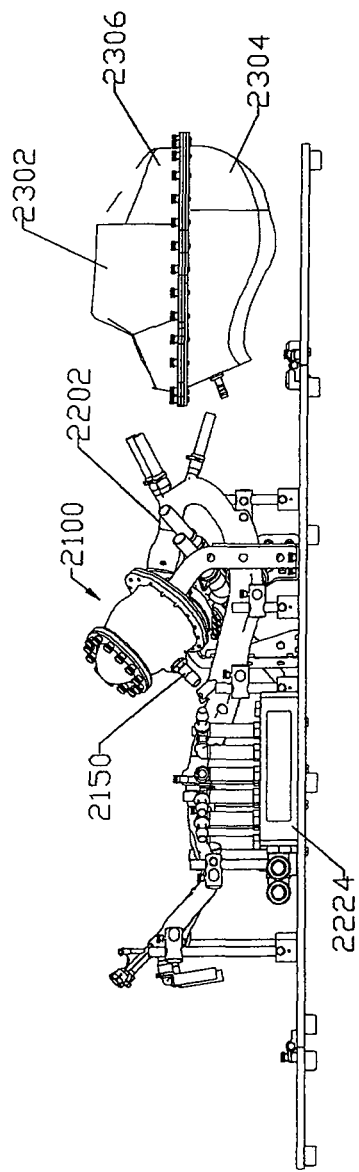
FIG. 33 is a back side view of the anatomical module.

Fluids, such as liquids simulating blood, circulate through the system 10 through both the anatomical module 2000 as well as though the hydraulic module 1300. The fluid hydraulics circuit of the anatomical module 2000 and hydraulics module 1600 is made up of the anatomical vasculature module 2200 (FIG. 31) as well as an interconnected loop that passes from the arterial manifold 2224 (FIG. 31) through the control module 1000 and hydraulics module 1300 and returns to the anatomical module 2000 through the pulmonary manifold 2236. The liquid fluid flow through the system 10 can be outlined as follows. Fluid passing from the arterial manifold 2224 is hydraulically connected to a quick disconnect fluid connector 1044 on the recessed panel 1042 (FIG. 3). Fluid passes from the quick disconnect fluid connector 1044 into a control module fluid in entry manifold 1329, see FIG. 4. The control module fluid in entry manifold 1329 contains 2 exit ports on the arterial side, not shown. One of these ports is connected though a butterfly valve to the compliance chamber 1500. The other connection allows flow to the hydraulics module 1300 through a quick disconnect fluid connector 1330 (FIG. 18). Connection of tubing to the quick disconnect fluid connector 1330 allows fluid to enter the hydraulics module entry manifold 1332.

Fluid flows from the port 1334 of the hydraulics module entry manifold 1332 through the bubble trap 1336. An illustrative example of the bubble trap 1336 may contain an entry tube and exit port in which the entry tube is higher than the exit port in order to cause air to propagate to an air venting valve. The entry tube and exit port of the bubble trap are contained within a chamber larger in volume than normal system piping in order to reduce flow velocity. Any air trapped in the liquid is separated out and back into a non-contiguous section of the hydraulics module entry manifold 1332 through the port 1338. Fluid flow then continues to the hydraulics loop manifold 1340 via a clear PVC pipe 1342 where it then continues out port 1346 to the capillary restriction valve 1348. The capillary restriction valve 1348 provides a means of adjusting flow conditions to the anatomical module 2000 through, for example, the arterial simulated and pulmonary simulated circuits. The capillary restriction valve 1348 provides the system the capability to replicate capillary resistance found normally in the human body. Adjustment of the restriction valve 1348 simulates the resistance normally provided by the capillary and arterial system of a human. Use of the capillary restriction valve 1348 works in conjunction with vascular compliance, simulated through compliance chamber 1500, determines the resistance associated with the cardiac module 2100, i.e. resistance the heart pumps, and consequentially the representation of the systolic and diastolic blood pressure. Manipulation of the flow rate through the capillary restriction valve 1348 by adjustment knob 1349 renders various flow conditions found in a live cardiac system. From the capillary restriction valve, flow passes to the hydraulics module exit manifold 1344 where fluid exits the hydraulics module through quick disconnect port 1356. Fluid flows from the quick disconnect port 1356 to the control module fluid in entry manifold 1329 where it exits through port 1046, see FIG. 3, as it returns to the anatomical module 2000 at the pulmonary manifold 2236, see FIG. 31.

The hydraulics module 1300 provides fill function for the anatomical and hydraulics flow circuit through a fluid connection 1358 to an in-line squeeze bulb pump 1359 (see FIG. 4) connecting to fluid reservoir 1400. The squeeze bulb pump 1359 is actuated by hand to draw fluid from the fluid reservoir module 1400 to the hydraulics module 1300. Alternatively, the fluid can be drawn into the hydraulics module 1300 through other means such as an electrical pump. Fluid entering the hydraulics module 1300 through the aforementioned fluid connector 1358 is connected to a three way ball valve 1360 and labeled as "1" "system fill", having a side port A, 1360A, a side port B, 1360B, and a center diverting port 1360C. The ball valve 1360 can be actuated to make connections from side port 1360A to diverting center port 1360C, to a closed position with no connecting ports, and to connecting side port 1360B to diverting port 1360C through control knob 1362. Fluid from the 1358 connector enters the 3 way ball valve through 1360A side port and exits though center diverting port 1360C if the valve 1360 is actuated to this connection. Fluid flows from valve port 1360C to the hydraulics module exit manifold 1344. During the initial fill cycle, the capillary resistance valve 1348 is actuated to a closed position so that fluid being pumped into the hydraulics circuit from the squeeze bulb pump 1359 must propagate through the entire flow circuit before reaching de-bubbler 1336 and system rapid de-air vent 1364, see FIG. 18. The system rapid de-air vent 1364 is located on the loop manifold 1340 port 1366 and provides venting functions for initial fill only. When fluid reaches a poppet float valve (not illustrated) enclosed within, the vent closes for the duration of pressurized system use. When a fill and a de-air cycle are complete, or the system fill bulb is not in use, the system fill ball valve 1360 is actuated to the closed position to maintain fluid pressure.

After the initial fluid fill, the capillary resistance valve 1348 is opened and tubing representing the arterial supply line (the supply line for moving fluid away from the cardiac simulator module 2100) is disconnected. The cardiac simulator module 2100 is used to pump fluid through the anatomical module 2000 which can be directed to make fluid connections from the highest point on the anatomical circuit, such as to an accessory organ/system module 2300, such as tubing which represents a point located on a Circle of Willis output if a head is used as the accessory organ/system module 2300, to a quick disconnect coupling 1056, see FIG. 3. The fluid is then directed to the hydraulics module 1300 though a quick disconnect fluid connector 1367, see FIG. 18. Fluid entering through the quick disconnect fluid connector 1367 is hydraulically coupled to a ball valve illustrated herein as 1372 (FIG. 21) and labeled as "3" "Model De-Air" on FIG. 22. The three way ball valve 1372 has a side port A, 1372A, a side port B, 1372B, and a center diverting port 1372C. The ball valve 1372 can be actuated to make connections from side port 1372A to diverting center port 1372C, to a closed position with no connecting ports, and to connecting side port 1372B to diverting port 1372C. Fluid enters the ball valve 1372 through port 1372C, and in use as model de-air, functioning is connected to port 1372A when the valve 1372 is actuated to this position. Fluid containing air bubbles from the anatomical vascular model enters the hydraulics module entry manifold 1332 through a side port 1364 (FIG. 18). Bubbles and fluid entering from side port 1374 on the hydraulics entry manifold 1332 pass through the de-bubbler 1336 where the air is separated and vented. The model de-air 1372 three way ball valve can also be used to propagate additional flow through the vasculature module 2200, simulated as neurovessel vasculature, by selecting the 1372B port on the valve 1372 using knob 1376. The knob 1376 is hydraulically coupled to a side port on the hydraulics exit manifold 1344. Such action can be used to set an appropriate amount of flow on the capillary resistance valve 1348.

The hydraulics system de-air circuit consists of the rapid de-air vent, a system pressure relief 1375, and the de-bubbler unit 1336. These units expel air and fluid to a common vent line (not illustrated) which is hydraulically coupled to a 3 way ball valve (not illustrated but represented generally by 1377 and labeled by the "2" "System De-Air" on FIG. 22). The three way ball valve represent by 1377 has a side port A, a side port B, and a center diverting port C. The three way ball valve represent by 1377 can be actuated, through knob 1378 to make connections from its side port A to the diverting center port C to a closed position with no connecting ports, and to connecting side port B to diverting center port C. The common vent line is hydraulically coupled to the side port A of the 1377 ball valve. If the valve is actuated to connect A and C ports, then air or fluid will flow through the valve represent by 1377 to the fluid connector 1358 on recessed panel 1314, see FIG. 18. Fluid passing through the connector 1358 is vented to a port on the reservoir module 1400. The system De-Air valve 1377 can also be closed for system pressure retention.

The hydraulics module can be drained for transport or maintenance by actuating the system fill and system de-air ball valves 1360 and 1377 to the drain position by actuating both valves to their B port. A drain connection is made to a tube 1380 (FIG. 20) which connects to loop manifold 1340. As the hydraulics module and connected circuits are drained, air is drawn in through drain vent 1382, (FIG. 18) and displaces water draining out of drain tube 1380. The hydraulics module 1300 may contain a gauge 1384 fluidly connected to the hydraulics entry manifold 1332 through connector 1386. The gauge 1384 may also be fluidly connected to the pressure relief valve 1375 through connector 1388. The gauge 1384 therefore can be used to measure the incoming fluid pressure, represented as the arterial input before reaching the capillary valve 1348. Excess pressure can be released to the fluid reservoir module 1400 so that the desired fluid pressure, such as 0-200 mm/Hg, can be achieved.

Figure 2:
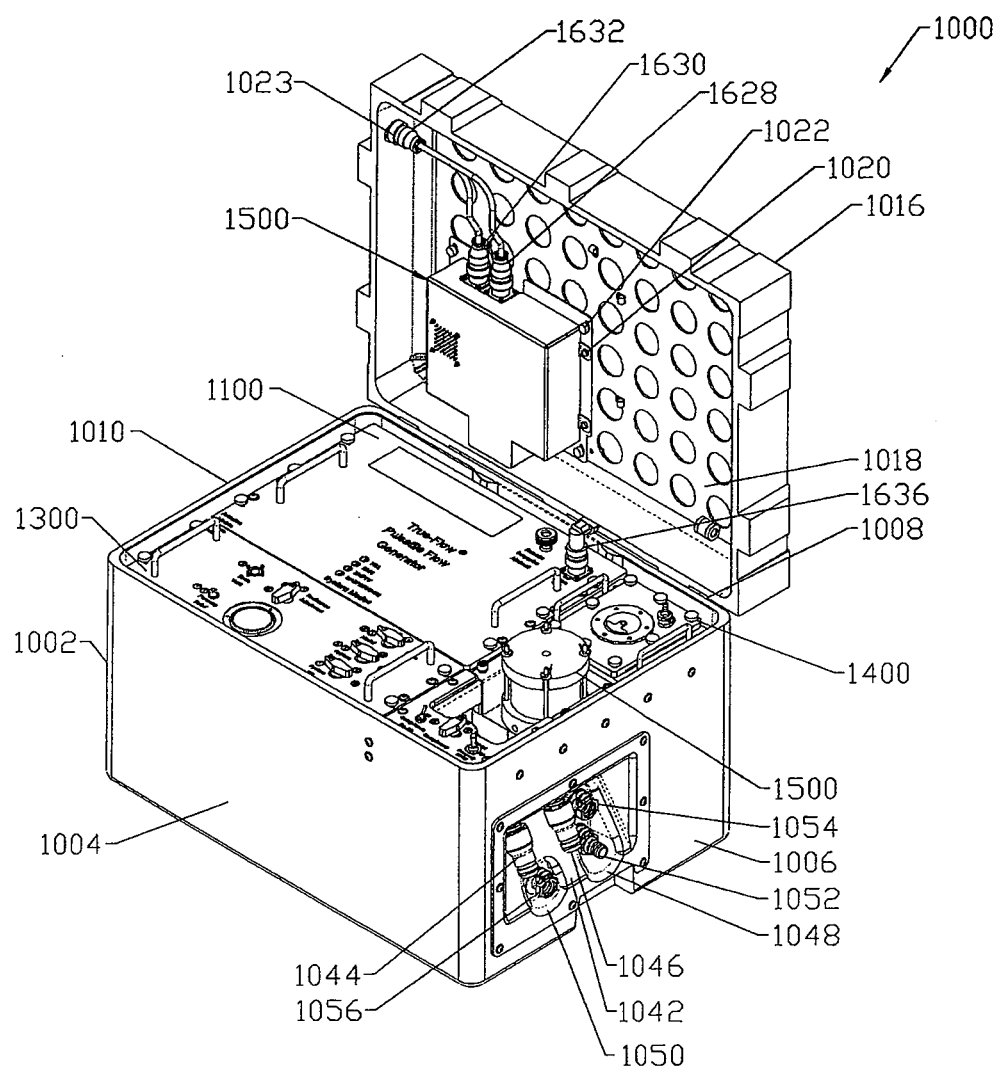
FIG. 2 is a perspective view of a controller module of the present invention.
Figure 4:
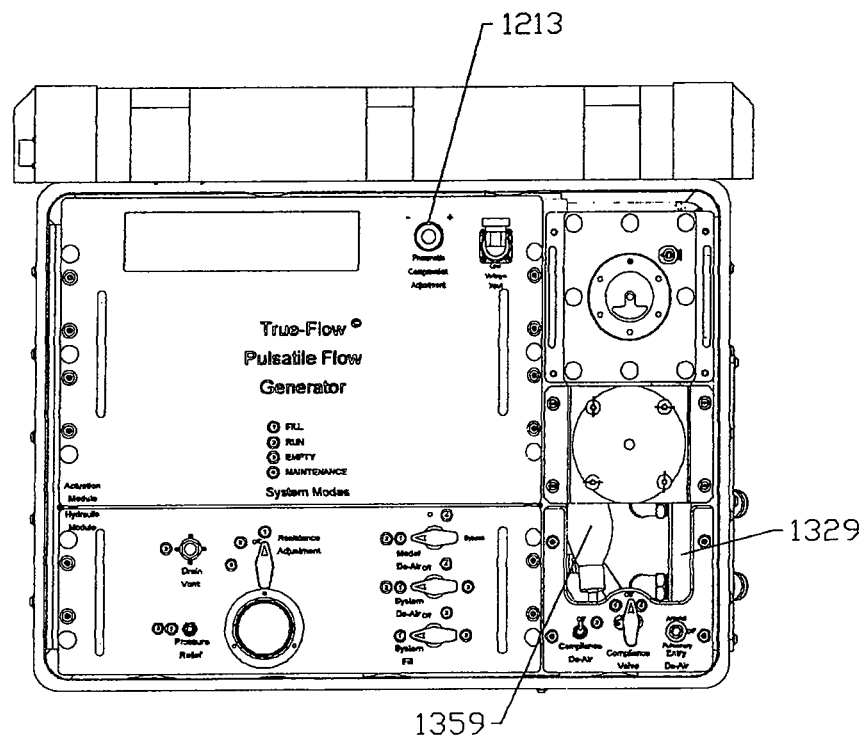
FIG. 4 is a top view of the controller module.
Figure 5:
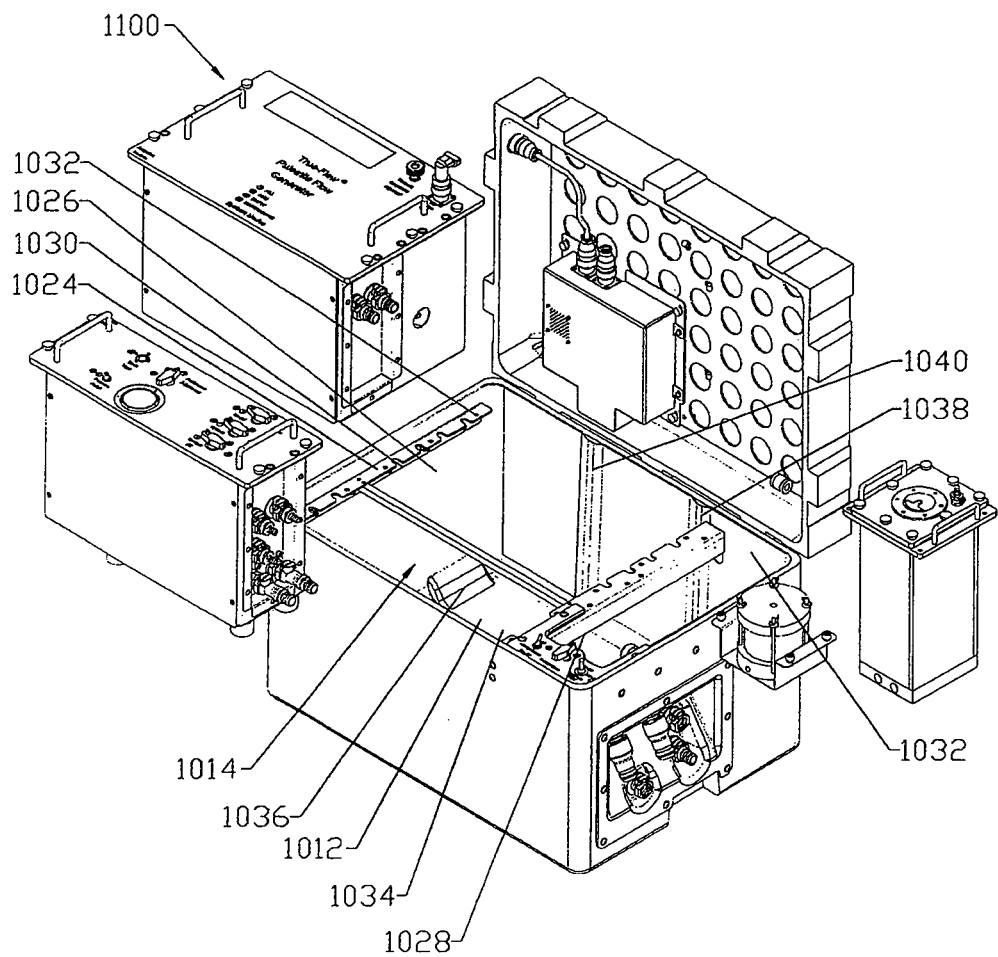
FIG. 5 is an exploded perspective view of the controller module.
Figure 23:
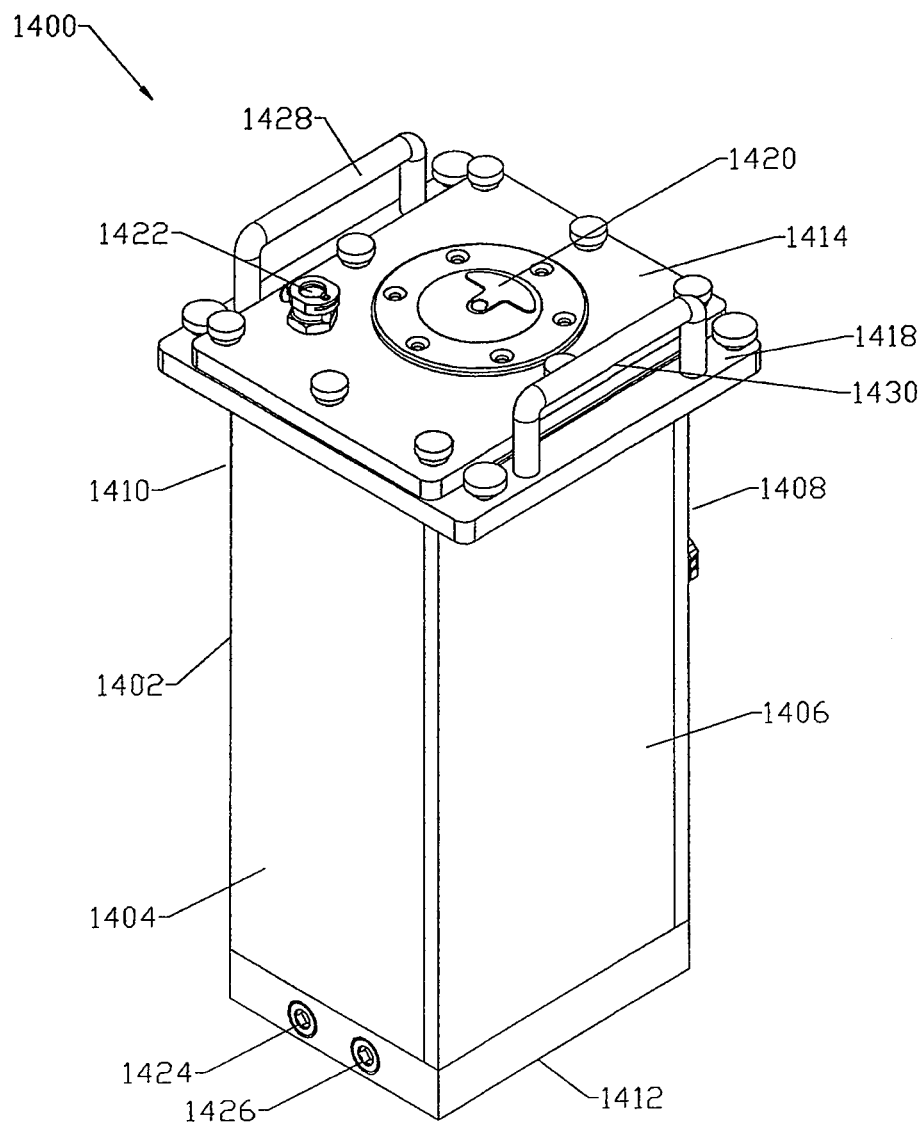
FIG. 23 is a perspective view of an illustrated embodiment of a fluid storage module.
Figure 24:
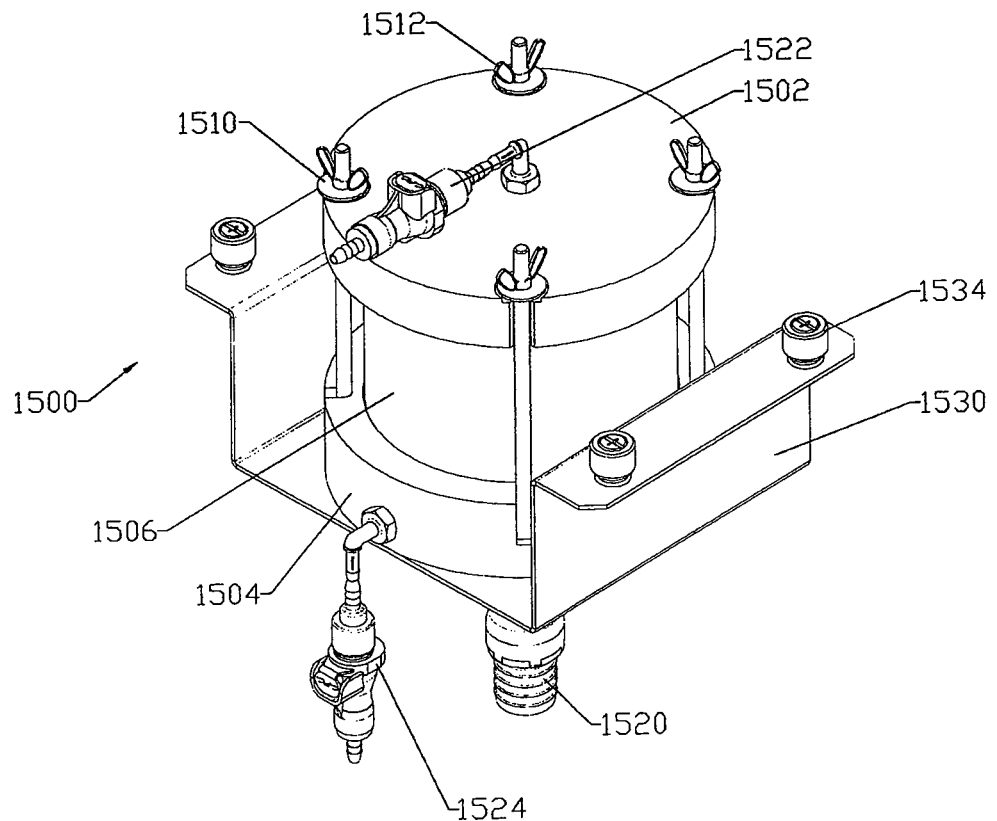
FIG. 24 is a perspective view illustrating one embodiment of the vascular compliance module of the present invention.
Figure 25:
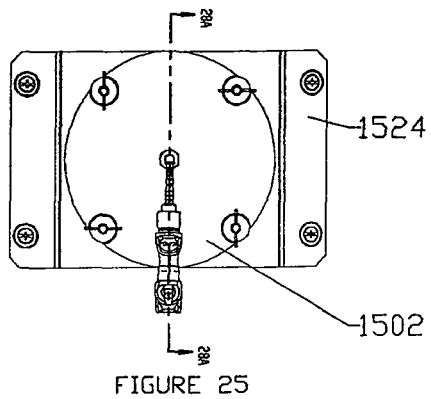
FIG. 25 is a top view of the vascular compliance module.
Figure 27:
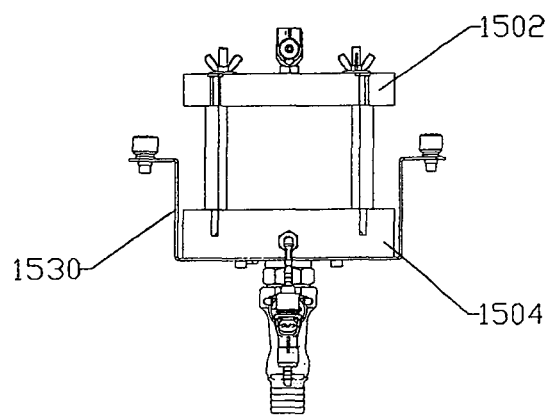
FIG. 27 is a front view of the vascular compliance chamber.
Figure 26:
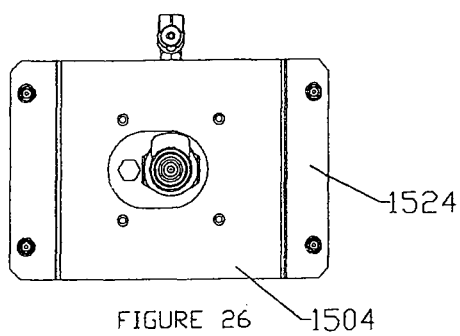
FIG. 26 is a bottom view of the vascular compliance module.
Figure 28:
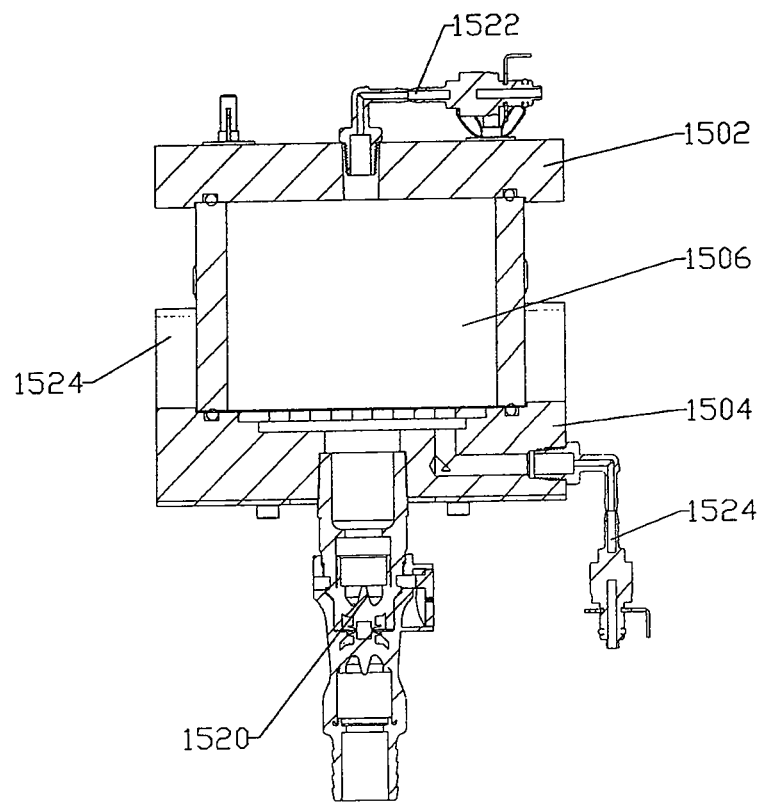
FIG. 28 is a cross-sectional view taken along lines 28A-28A of FIG. 25.
Figure 29:
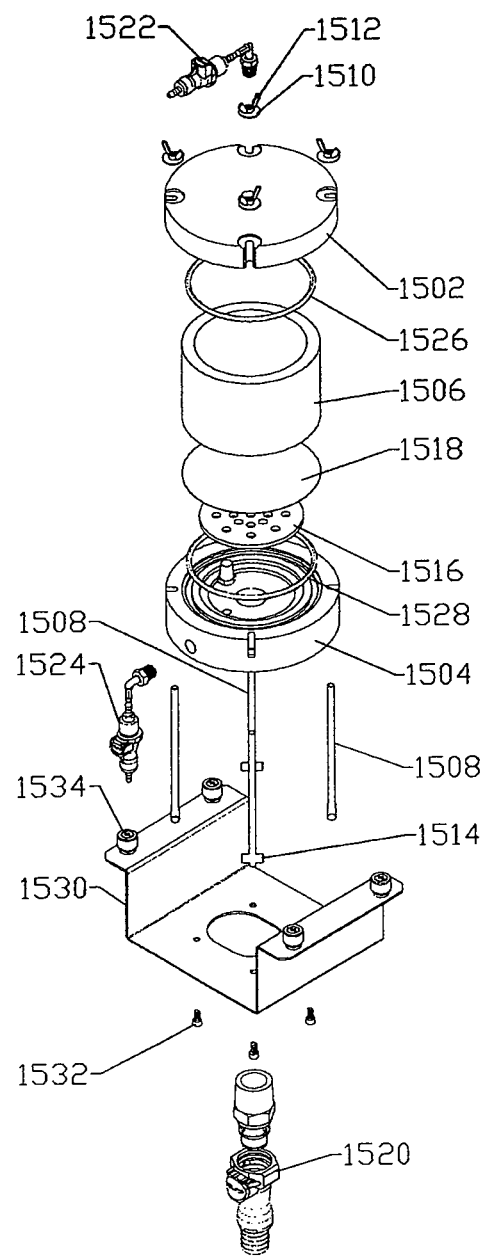
FIG. 29 is an exploded perspective view of the vascular compliance chamber.

Referring to FIGS. 2, 4, and 23, the control module 1000 further contains a fluid reservoir module 1400. The fluid reservoir module 1400 contains a fluid storage chamber 1402 adapted to hold a fluid, and may contain a check valve to control back flow of fluid. The fluid can be any liquid that simulates blood. In a preferred embodiment, the fluid is a clear blood analog having properties which duplicate the viscosity of human blood and mimics the friction coefficients as endovascular devices, wires, and catheters traverse the vasculature system. Alternatively, the fluid can be whole blood. Accordingly, any fluid can be used and modified to have the viscosity and/or flow rate that is the same as or approximates that of blood flow through veins or arteries. The fluid could be clear, or may include a dye so that the fluid flow can be visualized throughout the system. In any form, the fluid storage chamber 1402 contains a plurality of side walls, 1404, 1406, 1408, and 1410, and a bottom wall 1412 (not illustrated). A top cover 1414 provides an enclosed interior portion 1416 (not illustrated) for storage of the fluid. The top portion contains a ridge 1418 extending around the perimeter which is used to attach to the top end of the side wall 1006 of the control module chamber chassis at one end and to fastening beam 1028. The top cover 1414 may contain indictors, such as a gauge 1420. A window may be utilized to provide visual confirmation of flow level.

A fluid connector 1422 may be used to fill and/or remove the liquid. The bottom section of side wall 1404 may contain openings 1424 and 1426 to provide for fluid connectors to other components of the system for fluid connection into the fluid storage chamber 1402, or for attachment to a water drain system. Handles 1428 and 1430 attach to the fluid storage chamber 1402 to provide easy removal from and placement into the control module 1002. As described previously, to start the fluid flow, the fluid storage chamber 1402 is fluidly connected to a pump, illustrated herein as a hand pump 1359, see FIG. 4. Engaging the hand pump 1359 (see FIG. 4) through squeezing or compression causes fluid to flow from fluid storage chamber 1402 into the hydraulics module 1300. Electrical pumps connected to the electrical module or other mechanisms which can activate flow of the fluid can be used.

Referring to FIGS. 24-28, an illustrative example of a compliance chamber module 1500 is shown. The compliance chamber module 1500 acts as a system fluid storage device and is adapted to functionally provide compensation for the fact that the entire vasculature system is not modeled. Accordingly, the compliance chamber provides an anatomically correct range of cardiac system compliance and compensation given that the system 10 does not replicate all vasculature vessels contained within the entire human cardiovasculature system. For example, vasculature to the lower extremities, particularly the legs, is generally not included as part of the vasculature module 2200. To replicate accurate cardio dynamics with anatomically accurate cardiac physiology while pumping into an incomplete modeled vascular system, the compliance chamber is used. The compliance chamber simulates the vascular volume and tonometry of the non-molded parts of the system. The vascular tonometry simulates arterial tension and can be changed by adding or removing air from the compliance chamber 1500. Depending on the amount of air, the conditions of hypertension or hypotension can be simulated.

Preferably, the compliance chamber module 1500 is placed within the system in which fluid flow is returning from the vasculature simulator module 2200 on its way toward the hydraulics module 1300, and can be fluidly attached to the control module fluid in entry manifold 1329. Fluid enters into the compliance chamber module 1500 and can be controllably replaced back into the system. The compliance chamber module 1500 contains a top cover plate 1502, a bottom plate 1504, and a main body 1506 there between. The main body may be constructed of a clear plastic material to allow for visualization of the contents therein. Several chamber stud posts 1508, attached to the top cover plate 1502 through a washer 1510 and wing nut 1512, secure the top cover plate 1502 to the bottom plate 1504. The chamber stud posts 1508 may contain a swivel nut or threaded nut 1514 at one end to secure to the bottom cover. The main body contains a screen 1516 and diaphragm 1518 positioned at the bottom plate 1504. The diaphragm separates the main body 1506 into a top portion and a bottom portion, and is made of a material that prevents liquid or gas fluids from diffusing or crossing through.

Fluid, such as the fluid circulating through the anatomical module 2000 and representing blood flow, enters into the main body 1506 through a first fluid inlet/outlet 1520. A gas can be inserted into the space above the diaphragm 1508 through a second fluid inlet/outlet 1522 and provides back pressure acting against the diaphragm 1518. Additional air or gas placed into the main body 1506 increases the back pressure while removal of the gas decreases the back pressure. Based on the amount of gas in the compliance chamber, the flow of liquid out of the chamber is controllably released back into the system 10. A third fluid inlet/outlet 1524 may be used to bleed out any excessive pressure built up if needed. O-rings 1526 and 1528 are sealed against the top cover plate 1502 and the bottom plate 1504 respectively. The compliance chamber module 1500 rests on a compliance chamber module mount 1530 and secures to the control module chamber chassis 1002 through fastening devices, such as screws 1532 and set screws 1534. The use of the diaphragm 1518 is illustrative only and may be replaced with other accumulators that use pistons, springs, or bladders as known in the art.

Figure 30A:
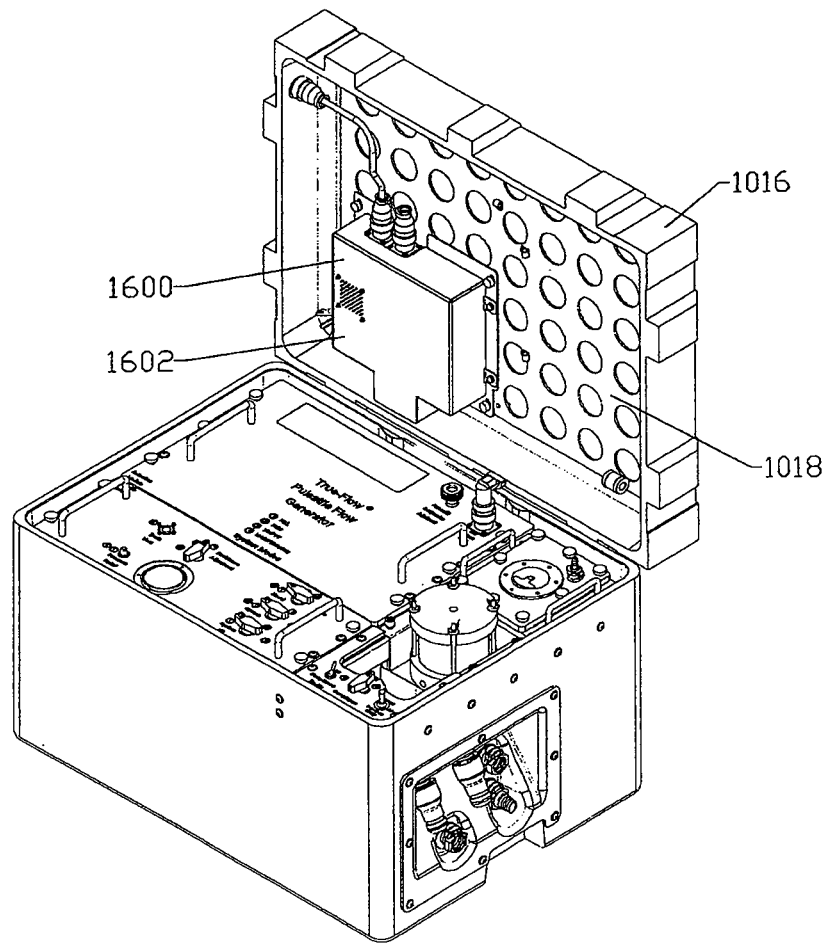
FIG. 30A is a perspective view of the controller module with an illustrative embodiment of the electrical module.
Figure 30B:
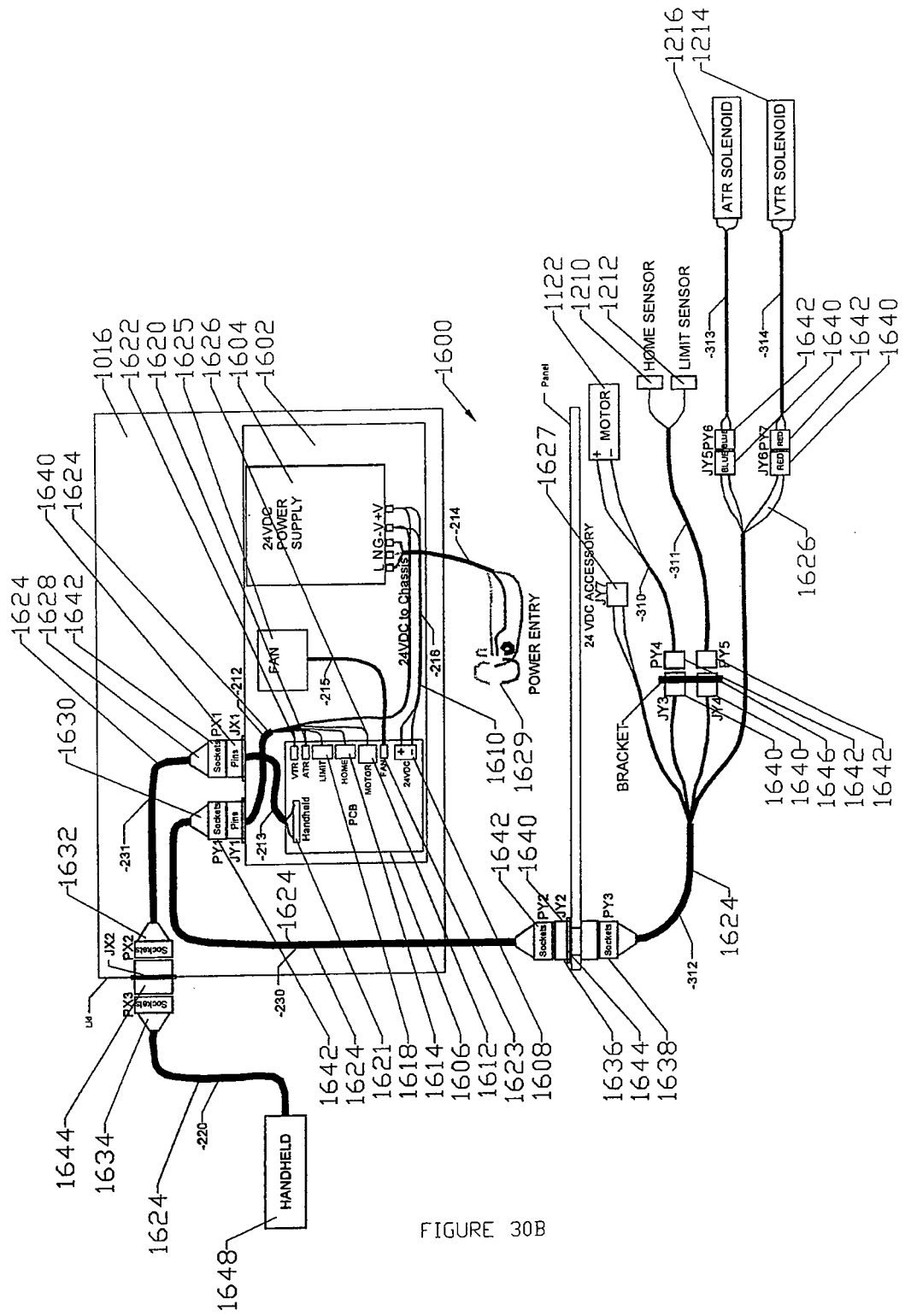
FIG. 30B illustrates one embodiment of an electrical schematic suitable for use with the present invention.

Referring to FIGS. 30A and 30B, an illustrative embodiment of the electronic control module 1600 is shown. The electronics module 1600 contains the main controlling aspects of the system 10, including a plurality of logic chips that allow the system to function and/or to be modified based on the task to be undertaken. In the illustrated example, the electronic control module 1600 is located on the inner surface 1018 of the control module chamber chassis cover 1016 and has the main function of providing the power and circuitry for driving the interactions between the modules.

Several of the components are secured to the control module chamber chassis cover 1016 and enclosed by an electronics module cover 1602. Alternatively, the components may be housed in a removable electronics module chassis. A main power supply, illustrated herein as a 24V DC regulated AC to DC converter 1604, provides power to the system 10 and is electrically coupled to an electronic controller circuit board 1606 at power connection 1608 through cable 1610. Alternatively, the main power supply could be an external 24V DC battery. The electronic controller circuit board 1606 contains individual logic circuitry for various components of the system 10. Each of the circuitry is connected at various connection points, including the pneumatic module motor logic connector 1612, the first and second sensors logic connectors 1614 (home sensor) and 1618 (limit sensor), the atrium solenoid logic connector 1620, the ventricle solenoid logic connector 1622, the handheld device logic connector 1621, and a fan logic connector 1623, are electrically coupled to the motor 1122, first and second sensors 1210 and 1212, the atrium solenoid 1216, the ventricle solenoid 1214, a fan 1625 (to cool down the control system), or an 24V DC accessory 1627. Additionally, the main power supply 1604 may also be coupled to a power entry 1629. Electrical coupling can be accomplished by means known to one of skill in the art, and may include, for example the use of a series of cables 1624 and electrical wiring 1626 which connect through the use of electrical connectors such as 1628, 1630 1632, 1634, 1636, and 1638. Each of the connectors may contain electrical pins 1640, electrical sockets 1642, or male/male feed thru devices 1644. Additionally, brackets 1646 may be used to support one or more of the connectors.

Figure 30C:
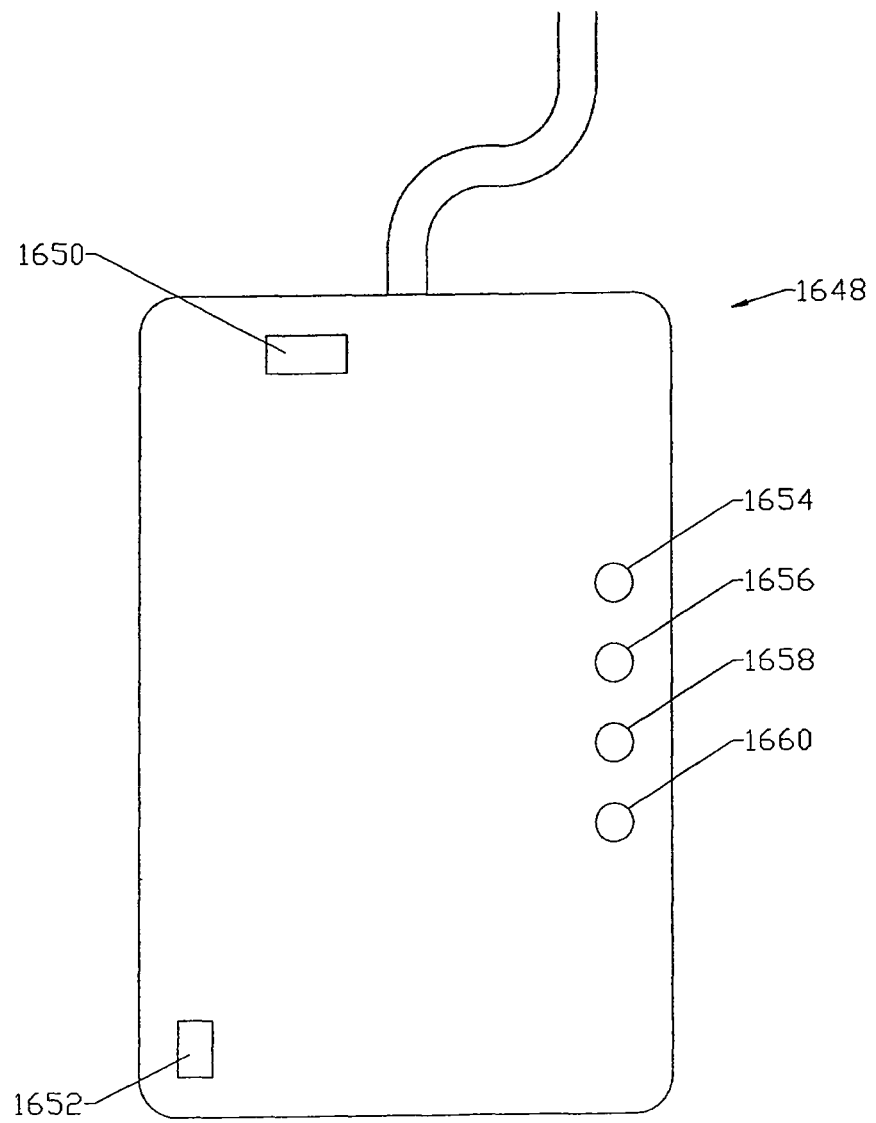
FIG. 30C illustrates one embodiment of a handheld device suitable for use with the present invention.

A handheld device 1648 is electrically coupled to the electronics module 1600 through the circuit logic connector 1621 to allow the user the ability to control the functioning of the system and manipulate one or more of the modules. Any of the control mechanisms or operational parameter adjustments discussed throughout the application can be controlled using the handheld unit 1648. Referring to FIG. 30C, an illustrative example of the handheld device 1648 is shown. The handheld device 1648 is constructed to provide a mixture of command functions and visual indicators. For example, a cardiac rate control knob 1650 can be manipulated by the user to control the cardiac module 2100, thereby affecting the heart rate (beats per minute) simulation. A run-stop switch 1652 acts to pause one or more aspects of the system, preferably the beating of the heart, while allowing other aspects of the system to function. Several indicator LEDs are used to indicate function of one or more aspects of the system, including, but not limited to, the power 1654, the atrium assembly 1656, the ventricle assembly 1658, and the system run 1660.

The control module 1000 interacts with the anatomical module 2000 by delivering pressurized air flow and liquids to the cardiac simulator module 2100. The action of the pressurized air allows the cardiac simulator module 2100 to function like a heart muscle of an individual or animal by contracting and expanding, forcing fluid representing blood flow to travel within the vasculature simulator module 2300. The control module is designed to supply pulses of pressurized air to the cardiac module 2100. Fluid pressures and fluid dynamics/flows are created by the pumping action of the cardiac module itself. FIGS. 31-40 illustrate the components of the cardiac simulator module 2100, as well as the vasculature module 2200. The Figures additionally illustrate the attachment of an embodiment of the accessory organ/system module 2300, illustrated herein as a head.

The cardiac simulator module 2100 is secured to a support board 2102 through a cardiac simulator module support structure 2104 through fastening members, such as screws 2106. The cardiac simulator module 2100 comprises several chambers representing the left side of the heart, and includes an atrial actuator, illustrated herein as a left atrium assembly 2108, and a ventricle actuator, illustrated herein as a left ventricle assembly 2110. The atrium and the ventricle may be molded using a standard size and shape. Preferably, the present invention uses an atrium and a ventricle that have been molded using Computer Tomography (CT Scan) imagery of a heart as well as its vasculature. The atrium and ventricle can be molded to represent the exact size and shape analogous to that of individual patients.

The left atrium assembly 2108 pneumatically connects to the fluid connector 1178 through tubing, not illustrated. Pressurized air enters the left atrium assembly 2108 through the atrium pneumatic-in connector 2111 which is coupled to an elbow connection 2112 to tube barb 2114 for fitting to a tube. The left atrium assembly 2108 contains an outer air pneumatic support structure 2116 which is preferably fabricated from a hard, firm, clear cast plastic, such as urethane. Inside of the outer air pneumatic support structure 2116 is a flexible bellow assembly 2120, see FIG. 36, which is pneumatically connected to elbow connection 2112 to tube barb 2114. Pneumatic pressure generated from the pneumatic modules and pneumatically connected to the atrium pneumatic-in connector 2111 inflates the bellows. Additional injection ports may be included to provide a mechanism to inject dyes or representative medicine into various places within the system 10. As the bellow assembly 2120 expands it compresses a left atrium chamber 2122. The bottom ends 2124 and 2126 of the atrium outer air pneumatic support structure 2116 connect to plates 2228 and 2230, see FIG. 38.

The left atrium chamber 2122 is preferably made of a soft, flexible, clear silicone which is capable of contracting and expanding. To allow fluid flow into the left ventricle at the appropriate time, i.e. when the left atrium contracts, without fluid flowing back into the left atrium upon relaxation, the left atrium 2128 contains a one way valve, illustrated herein as a synthetic valve 2129, see FIG. 36. The valve 2129 represents a mitral valve, and as an illustrative example could be a synthetic replication. Alternatively, the valve may be a transplant of an actual mammalian mitral valve, such as a swine, or a human mitral valve.

Figure 34:
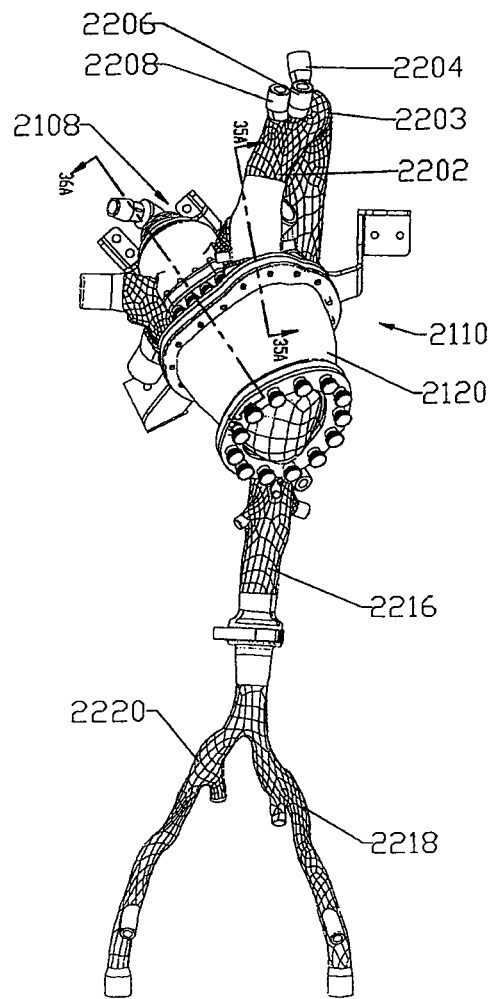
FIG. 34 is a partial perspective view of the cardiac simulator module and ventricular module.
Figure 35:
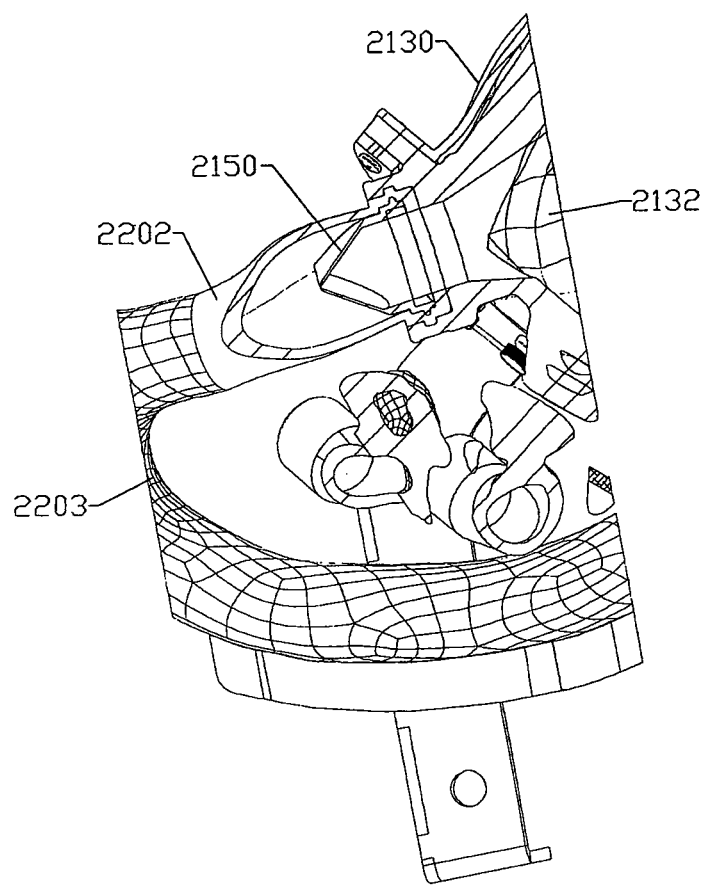
FIG. 35 is a partial cross-sectional view taken along lines 35A-35A of FIG. 34, showing an aortic valve and aortic arch.
Figure 36:
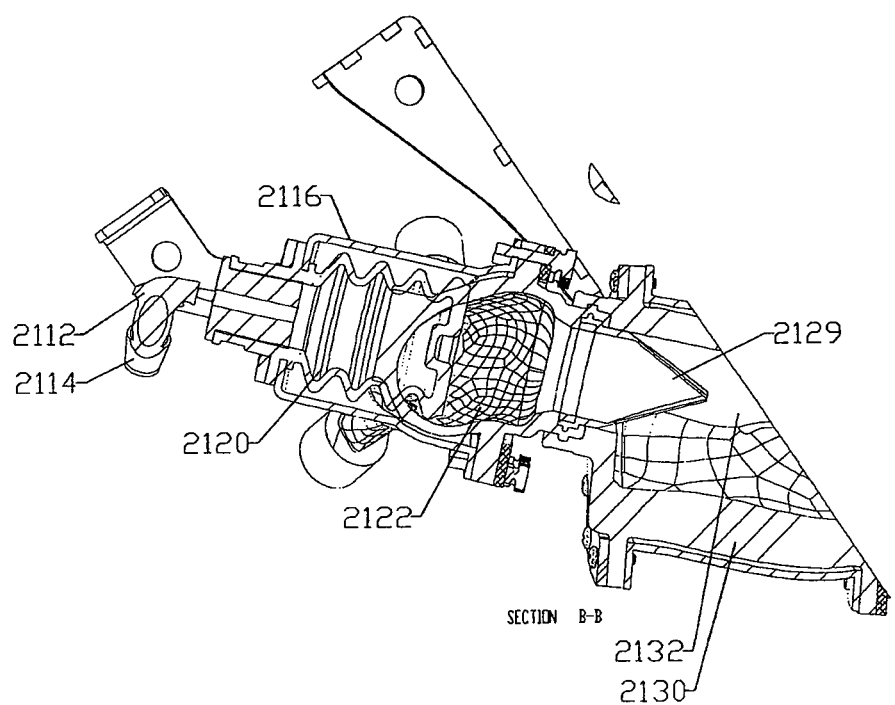
FIG. 36 is a partial cross-sectional view taken along lines 36A-36A of FIG. 34 showing the atrial compression mechanism, the atrial chamber, and the mitral valve.
Figure 38:
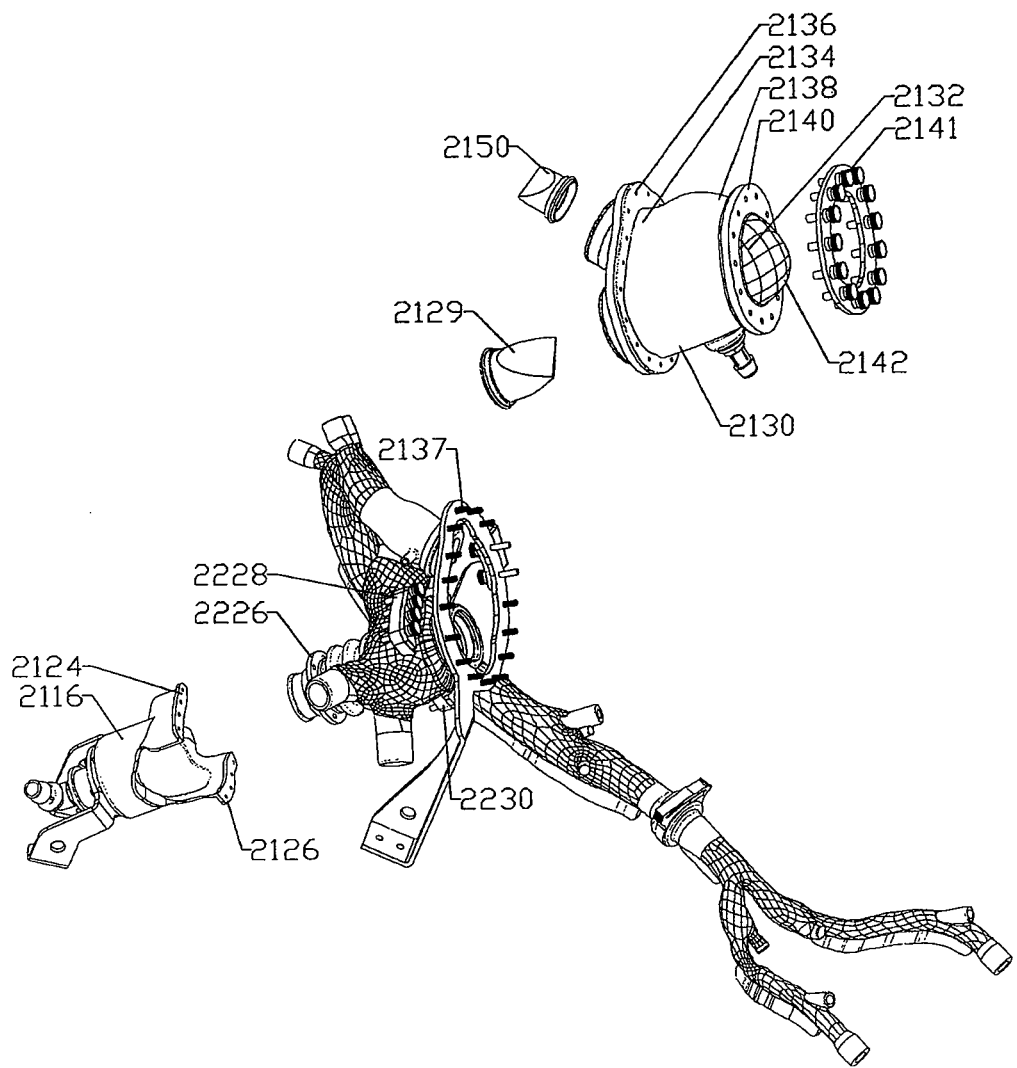
FIG. 38 is an exploded view of the cardiac simulator module.

The left ventricle module 2110 is composed of a left ventricle pneumatic chamber 2130 which surrounds the left ventricle chamber 2132, see FIGS. 34, 36, and 38. The left ventricle pneumatic chamber 2130 is preferably fabricated from a hard, firm, clear cast plastic, such as urethane. The left ventricle chamber 2132 is preferably made of a soft, flexible clear plastic, such as silicone. A first end 2134 of the left ventricle pneumatic chamber 2130 contains a flange 2136 for connection to the left atrium assembly 2108, preferably to a cardiac support structure 2137. The second end 2138 of the left ventricle pneumatic chamber 2130 contains a second flange 2140. The second flange 2140 connects to a ring 2141 sized and shaped to encircle an apex 2142 of the left ventricle chamber 2132. In this embodiment, apex 2142 does not contract with the rest of the left ventricle chamber 2132. In an alternative embodiment, the apex 2142 is fully enclosed by the left ventricle pneumatic chamber 2130, see FIG. 40.

Figure 39:
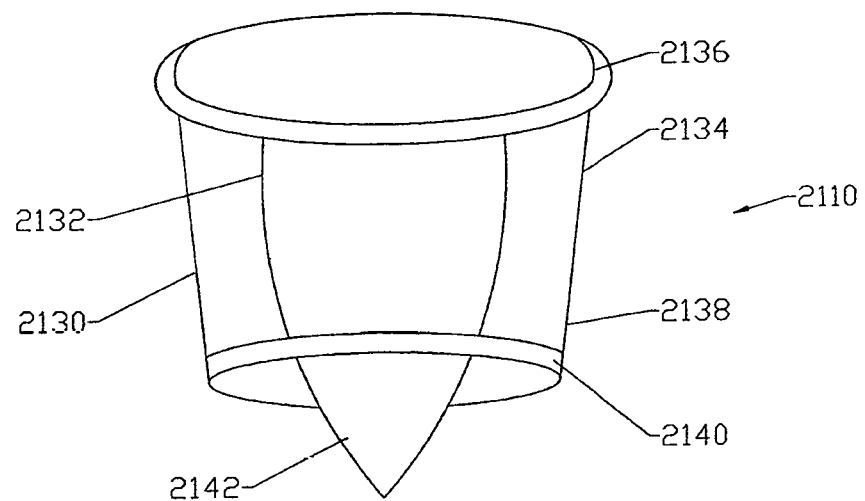
FIG. 39 is a side view of one embodiment of the ventricle and ventricle compression chamber.
Figure 40:
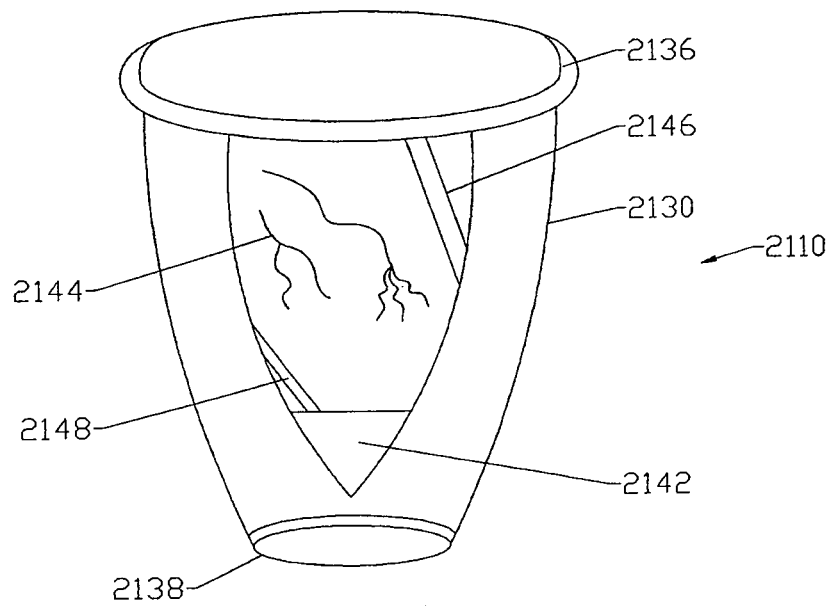
FIG. 40 is an alternative embodiment of the ventricular chamber and ventricle compression chamber.

As illustrated in FIG. 39, the left ventricle chamber 2132 does not include any vasculature. In an alternative embodiment, the left ventricle chamber 2132 includes anatomically correct vasculature 2144, such as the left coronary artery, the left circumflex artery, the left marginal artery, the left anterior descending artery, and the diagonal branch, of the left ventricle chamber 2132. The vasculature can be "normal" vasculature, or can be that of disease state vasculature. In addition, the normal or the disease state vasculature can be adapted to represent the exact vasculature of individual patients (through use of CT scans, MR and/or rotational angiography) or can be designed to represent normal/disease states of non-patient specifically. Moreover, sections of the ventricle chamber 2132 may include thick sections 2146 (simulating ventricular hypertrophy) and/or thinner sections 2148 (simulating ventricular hypotrophy) to simulate differing resistance of the heart to contraction and expansion, see FIG. 40. While not illustrated, such features may apply to the atrium 2122 as well. The left ventricle module 2110 is fluidly connected to one or more parts of the vasculature module 2200 through various connectors. For example, fluid flows out of the left ventricle into the vasculature module 2200 through a valve, illustrated herein as a synthetic aortic valve 2150, see FIG. 35. The synthetic aortic valve 2150 may be constructed from a synthetic plastic or may be an animal such as a swine/pig or human aortic valve. In either case, the valve 2150 is designed to allow fluid flow at the proper time in one direction, i.e. out of the left ventricle chamber and into the vasculature module 2200.

Figure 37:
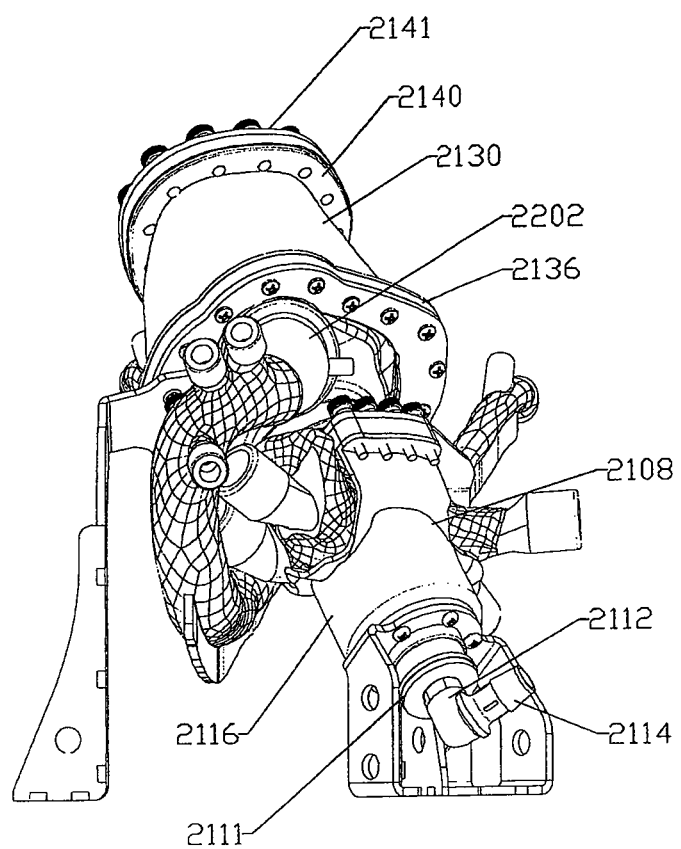
FIG. 37 is a back view of the cardiac simulator module illustrating the ventricular compression chamber, the aortic arch, and the atrial compression mechanism.

The vasculature module 2200 is made of a plurality of members, such as synthetic tubing, that provide fluid flow into and away from the cardiac simulator module 2100. Similar to the atrium and ventricle, the vasculature module 2200 tubing can be made to replicate the size, shape, and tonometry of the vasculature of specific patients. Preferably, the tubing is made of clear medical grade plastics having flexural modules, or stiffness, which corresponds to a desired need. Referring to FIGS. 1, 34 and 37, fluid flows out of the left ventricle chamber 2132 and into tubing representing the aorta 2202 and aortic arch 2203. One or more aorta connectors, such as but not limited to, 2204 (subclavian artery), 2206 (right common carotid artery), and 2208 (braciocephalic artery) are used to fluidly attach to other components of the vasculature module 2200, such as tubing representing the vertebral arteries 2210, and fluidly connect to the periphery organ/system module 2300 (illustrated on FIG. 31), the left common carotid artery 2212 and connected to fluid connector 2310 (illustrated on FIG. 31) and the right common carotid artery 2214 connected to fluid connector 2312 (illustrated on FIG. 31), see block diagram 1. Fluid further flows into the descending aorta 2216 and connects to the right Iliac artery 2218 and the left Iliac artery 2220. Fluid flow out of the cardiac simulator module 2100 is directed through the tubing and eventually into an arterial manifold 2224 through one or more arterial manifold inlets 2226, 2228, 2230, 2231, or 2232, depending on which part of the system the fluid is traveling, see FIG. 31. Fluid then travels out the arterial manifold 2224 through the output connector 2234, through tubing (not illustrated) back to the control module 1000.

Fluid typically enters the cardiac simulator module 2100, and then flows into the vasculature module 2200 through a pulmonary manifold 2236. Fluid flows into the pulmonary manifold 2236 through the pulmonary manifold inlet 2238 and out to tubing from the pulmonary manifold outlets 2240, 2242, 2244, and 2246. The outlets 2240-2246 connect tubing representing the two left pulmonary veins 2248 and 2250, and two right pulmonary veins 2252 and 2254, see block diagram FIG. 1. The two left pulmonary veins 2248 and 2250 and two right pulmonary veins 2252 and 2254 direct flow into the left atrium chamber 2132.

Each of the components of the vasculature module 2200 may be supported by adjustable elevation posts 2256 mounted to the support plate 2102 through support plate connecting elements 2258. The adjustable elevation posts 2256 also contain tab elements 2260 that are adapted to prevent interference with the natural reactions of the anatomical elements to flow and pressure wave transmission within the anatomical module 2000. The posts 2256 provide 360 degree access and visualization of the anatomical parts and/or surfaces of the cardiovasculature system 10 for observation and characterization. The posts 2256 can be adjustable in the Z-axis, and can be mounted in the X and Y coordinate movement bracket. The combined movements allow for the augmentation of the tortuosity or offsets to the anatomical relationships at various increments along the contiguous anatomy model. The posts 2256 may also provide light illumination to one or more tubing to illuminate pathways back to the interior of the anatomical module 2000 through the translucent or transparent components of the anatomical module 2000. The posts 2256 also provide for quick disconnect from one or more parts of the anatomical module 2000 for either replacement of one or more of the components or for exchange with other anatomical profile preferences.

Referring to FIGS. 31-33 and 41, the periphery organ/system module is shown as a head 2302. The head 2302 contains a bottom portion 2304 connected to a board 2305 and/or a top portion 2306 through fastening members 2308, such as screws or nuts. Such arrangement allows for the top portion 2306 to be removed and replaced. The bottom portion 2304 contains one or more fluid connectors 2310 and 2312 which are adapted to fluidly connect the head 2302 to one or more components of the vasculature module 2200. Such fluid connection allows the user to evaluate the effects of surgical techniques or procedures with peripheral organs or systems.

Figure 41:
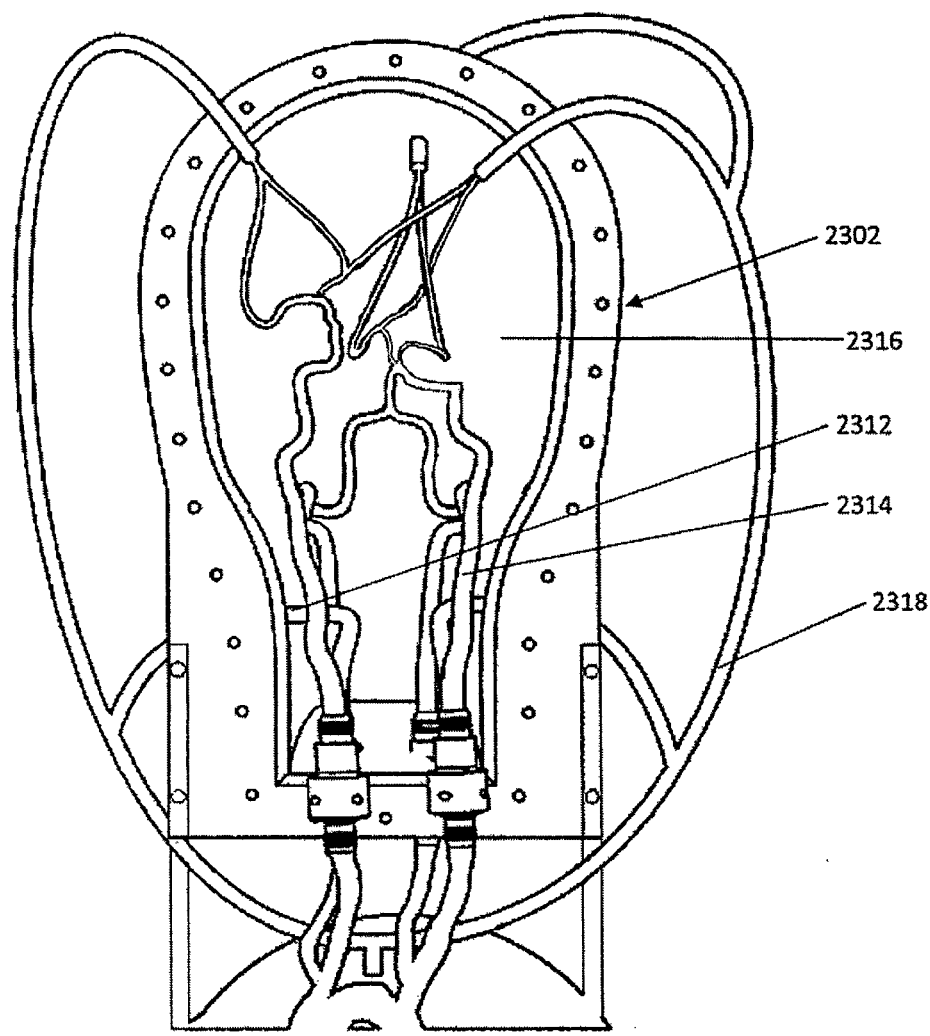
FIG. 41 is a perspective view of an illustrative example of the head unit with cerebrovasculature.

FIG. 41 illustrates an illustrative example of the head unit 2302 with a plurality of tubing, 2312 and 2314, representing the cerebrovasculature. The cerebrovasculature is placed within a gel like material 2316 in order to mimic the compliance of the vessels in the subarachnoid space and surrounding brain. The vasculature system, from the carotid bifurcation to the intracranial circulation, as well as any pathology can be replicated. The head unit 2302 may also contain additional tubing 2318 connectable to other parts of the system 10, such as to connector 1054.

Referring back to FIG. 1, the present invention can be further demonstrated through an illustrative example of the simulator system 10 cycle. Fluid, such as a liquid representing blood flow through the system, stored within the fluid reservoir module 1400, is passed through the manual hand pump 1359 with integral check valve module 1432. The fluid is passed through the primary de-bubbler and/or the rapid debubbler to remove any bubbles and/or gases that may have formed therein. Removal of the bubbles prevents fluid dynamics abnormalities which may negatively affect the precision and accuracy of the cardio dynamics of the system, thereby enhancing the overall system performance. Once de-bubbling is complete, the fluid enters the anatomical module 2000 through tubing which is fluidly connected to the pulmonary manifold 2236. Fluid in the pulmonary manifold 2236 represents oxygenated blood returning from the lungs, not used in the presently described system, and flows into the left atrium assembly 2108 through the two left and two right pulmonary veins.

The atrium chamber 2122 fills with fluid and the pressure of the fluid, measured at the systolic side of the circuit, is controlled by the control module 1000 to be in the minimal normal range for diastolic pressure of a human heart (50-80 mm HG). The actual blood pressure of 120/80 (systolic/diastolic) obtained by the system is a combination function of the fluid flow volume (simulated by manipulation of the control module in relationship to the cardiac simulator module), the cardiac simulated heart rate, arterial compression, ventricular compression (or ejection fraction, simulated as the amount of fluid ejected out of the atrium chamber or ventricle chamber), the capillary resistance (simulated effects by the manipulation of the compliance chamber) and the vascular tonometry or tension (simulated effects by the manipulation of the compliance chamber).

While the system does not independently adjust for systolic and diastolic values, various combinations of these parameters affect the systolic and diastolic numbers to varying degrees. The value of the diastolic pressure can be manipulated to above or below the normal ranges to simulate various disease states. Initiated by the control module 1000, the left atrium is contracted. The electronics module 1600 drives the motor 1122 directionally, clockwise or counter clockwise, moving the piston 1176 bi-directionally in the cylinder 1150 in a direction which creates pressurized air flow to be directed into the left atrium chamber 2128. The pressurized air generated flows through tubing and enters the outer air pneumatic support structure 2116 of the left atrium 2128. The air causes the atrium bellows 2126 to compress against the left atrium chamber 2122, reducing the volume within the left atrium chamber 2122. Reduction of the volume results in fluid being expelled through the mitral valve 2129 and into the left ventricle pneumatic chamber 2130.

At the proper timing, pressurized air generated from the return stroke of the piston moving within the cylinder is controlled by the interaction of the control module and the second pulley system. The pressurized air generated travels through the tubing of the vasculature module into the left ventricle pneumatic chamber 2130. The pressurized fluid causes a reduction of volume within the left ventricle chamber 2132, resulting in the expulsion of fluid through the synthetic aortic valve 2150 and into the aortic arch 2202. The pressure of the fluid is set within the normal range of normal systolic pressure, 100-160 mm Hg. The flow rate, 2-6 L/min of flow at 70 beats per minute of the heart and the ejection fraction (50-65%) is set within the normal range of the human heart. However, such conditions can be manipulated by the electronic control module 1600 to change the corresponding pressure, volume flow rate, ejection fraction, or combinations thereof. The fluid ejected from the left ventricle chamber is under pressure and flows through various portions of the ventricle module, such as the vertebral arteries, the left common carotid artery, and the right common carotid artery. Fluid also flows down to the descending aorta and into the right iliac artery and the left iliac artery. Eventually all fluid is directed to the arterial manifold 2224 and directed back to the control module 1000 in which the flow rate is adjusted, and air bubbles are removed. Vascular tension can be simulated and adjusted through several mechanisms, such as through the combination of the capillary resistance setting, the compliance chamber back pressure adjustments, and through the molded vasculature simulator module representing the arteries having various durometer values. Fluid is then returned to the pulmonary manifold to start a new cycle.

As described previously, abnormal heart conditions can be simulated by varying the force, duration, and frequency of the air burst generated by the atrium/ventricle air cylinder through commands sent from the control and adjustments within the fluid control system.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A cardiovasculature simulator system suitable for training and testing medical devices comprising:
    a cardiac system module for simulating cardiac functioning of a patient having an atrium assembly for simulating blood flow through an atrium of a heart and a ventricle assembly for simulating blood flow through a ventricle of a heart,
    said atrium assembly comprising a rigid outer casing sized and shaped to receive a pressurized pneumatic fluid, an expandable member positioned within said rigid outer casing, and a flexible, blood simulating fluid filled inner atrium chamber operatively coupled to said expandable member, said flexible, blood simulating fluid filled inner atrium chamber constructed and arranged to contract when said expandable member expands, thereby causing said blood simulating fluid stored within to be ejected out, and expand when said expandable member is depressurized,
    said ventricle assembly comprising a flexible ventricle assembly inner member fluidly coupled to said flexible inner atrium chamber whereby said blood simulating fluid exiting said flexible inner atrium chamber is received by said flexible ventricle assembly inner member and a rigid ventricle assembly outer member surrounding said flexible ventricle assembly inner member, said ventricle assembly inner member and said rigid ventricle assembly outer member being separated by a space therebetween, whereby pneumatic pressurized fluid inserted within said space exerts a force upon said flexible ventricle assembly inner member causing said flexible ventricle assembly inner member to eject said blood simulating fluid stored within, said flexible ventricle assembly inner member expanding when said pneumatic pressurized fluid exits said space between said inner flexible member and said outer rigid member;
    a vasculature system module comprising at least one tubing adapted to have anatomical or physiological characteristics of a normal or diseased human artery or vein and fluidly connected to at least a portion of said cardiac system module;
    a pneumatic supply module comprising a device for generating said pressurized pneumatic fluid fluidly connected to at least a portion of said atrium assembly and to at least a portion of said ventricle assembly whereby pressurized pneumatic fluid is delivered to said atrium assembly independently of delivery of pressurized pneumatic fluid to said ventricle assembly; and
    a control unit comprising one or more logic chips configured to control or modify one or more operational parameters of the cardiovasculature simulator system;
    whereby said cardiovasculature simulator system provides an anatomically and physiologically accurate representation of a cardiovasculature system in normal or diseased states.

2. The cardiovasculature simulator system suitable for training and testing medical devices according to claim 1 wherein said pneumatic supply module comprises a motor and an air cylinder.

3. The cardiovasculature simulator system suitable for training and testing medical devices according to claim 1 further including a hydraulics actuator.

4. The cardiovasculature system suitable for training and testing medical devices according to claim 1 further including a liquid fluid reservoir for storing said blood simulating fluid.

5. The cardiovasculature simulator system suitable for training and testing medical devices according to claim 1 wherein said blood simulating fluid is adapted to have characteristics of blood.

6. The cardiovasculature simulator system suitable for training and testing medical devices according to claim 1 further including a handheld control unit for modifying one or more operational parameters of said system.

7. The cardiovasculature simulator system suitable for training and testing medical devices according to claim 1 wherein said expandable member is a bellows.

8. The cardiovasculature simulator system suitable for training and testing medical devices according to claim 1 wherein said flexible atrium assembly inner member is anatomically modeled after an atrium of a patient.

9. The cardiovasculature simulator system suitable for training and testing medical devices according to claim 1 wherein said atrium assembly further includes a first cardiac module simulator valve.

10. The cardiovasculature simulator system suitable for training and testing medical devices according to claim 9 wherein said first cardiac module simulator valve is a synthetic valve.

11. The cardiovasculature simulator system suitable for training and testing medical devices according to claim 9 wherein said first cardiac module simulator valve is anatomically modeled after a specific patient.

12. The cardiovasculature simulator system suitable for training and testing medical devices according to claim 9 wherein said first cardiac module simulator valve is a mammalian cardiac valve.

13. The cardiovasculature simulator system suitable for training and testing medical devices according to claim 12 wherein said mammalian cardiac valve is a human, bovine, or swine.

14. The cardiovasculature simulator system suitable for training and testing medical devices according to claim 9 wherein said ventricle assembly further includes a second cardiac module simulator valve.

15. The cardiovasculature simulator system suitable for training and testing medical devices according to claim 14 wherein said second cardiac module simulator valve is a synthetic valve.

16. The cardiovasculature simulator system suitable for training and testing medical devices according to claim 15 wherein said second cardiac module simulator valve is anatomically modeled after a specific patient.

17. The cardiovasculature simulator system suitable for training and testing medical devices according to claim 15 wherein said second cardiac module simulator valve is a mammalian cardiac valve.

18. The cardiovasculature simulator system suitable for training and testing medical devices according to claim 17 wherein said mammalian cardiac valve is a human, bovine, or swine.

19. The cardiovasculature simulator system suitable for training and testing medical devices according to claim 1 wherein said tubing is anatomically modeled after a patient's vasculature system whereby said molding replicates the vasculature of said patient.

20. The cardiovasculature simulator system suitable for training and testing medical devices according to claim 1 further including a compliance chamber adapted to simulate vasculature compliance in normal or diseased states, said compliance chamber comprising a rigid shell separated into two parts by a diaphragm having a first side and a second side, said first side exposed to a blood simulating fluid and said second side exposed to pressurized air.

21. The cardiovasculature simulator system suitable for training and testing medical devices according to claim 1 further including a head fluidly coupled to said cardiac system module comprising a top portion, a bottom portion, and a plurality of said tubing suspended within a gel like material.

22. The cardiovasculature simulator system suitable for training and testing medical devices according to claim 1 further including a support structure.

23. The cardiovasculature simulator system suitable for training and testing medical devices according to claim 22 wherein said support structure further includes adjustable elevation posts.

24. The cardiovasculature simulator system suitable for training and testing medical devices according to claim 23 wherein said adjustable elevation posts are adapted to provide light illumination to one or more modules.

25. The cardiovasculature simulator system suitable for training and testing medical devices according to claim 1 wherein said flexible ventricle assembly inner member is anatomically modeled after a ventricle of a patient.

* * * * *